US011882576B2

(12) United States Patent
Taherzadeh Boroujeni et al.

(10) Patent No.: US 11,882,576 B2
(45) Date of Patent: Jan. 23, 2024

(54) TECHNIQUES FOR DYNAMIC SIGNALING FOR WIRELESS COVERAGE ENHANCEMENT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Juan Montojo, San Diego, CA (US); Qiang Wu, San Diego, CA (US); Iyab Issam Sakhnini, San Diego, CA (US); Xiaoxia Zhang, San Diego, CA (US); Peter Gaal, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/301,734

(22) Filed: Apr. 13, 2021

(65) Prior Publication Data

US 2021/0345343 A1 Nov. 4, 2021

Related U.S. Application Data

(60) Provisional application No. 63/018,928, filed on May 1, 2020.

(51) Int. Cl.
*H04W 4/00* (2018.01)
*H04W 72/53* (2023.01)
(Continued)

(52) U.S. Cl.
CPC ....... *H04W 72/53* (2023.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

| 11,743,910 B2* | 8/2023 | Lee ........................ H04W 72/23 370/329 |
| 2017/0026942 A1* | 1/2017 | Vajapeyam ......... H04W 72/042 |

(Continued)

FOREIGN PATENT DOCUMENTS

WO    WO-2017015528 A1    1/2017

OTHER PUBLICATIONS

"3rd Generation Partnership Project, Technical Specification Group Services and System Aspects, System architecture for the 5G System (5GS), Stage 2 (Release 16)", 3GPP Draft, 3GPP TS 23.501, V16.4.0, 23501-G40_CRS_IMPLEMENTED_CR2195FIX_CR2085 MOD_R4, 3rd Generation Partnership Project (3GPP), Mobile Competence Centre, 650, Route Des Lucioles, F-06921, Sophia-Antipolis Cedex, France, Mar. 27, 2020 (Mar. 27, 2020), XP051887241, pp. 1-429, Retrieved from the Internet: URL: https://ftp.3gpp.org/tsg_sa/WG2_Arch/Latest_SA2_Specs/DRAFT_INTERIM/Archive/23501-g40_CRs_Implemented_CR2195Fix_CR2085_mod_R4.zip 23501-g40_CRs_Implemented_CR2195Fix_CR2085_mod_R4.docx [retrieved on Mar. 27, 2020] para 5.30.
(Continued)

Primary Examiner — Bob A Phunkulh
(74) Attorney, Agent, or Firm — Dalei Dong; Harrity & Harrity, LLP

(57) ABSTRACT

Various aspects of the present disclosure generally relate to wireless communication. In some aspects, a user equipment (UE) may receive, in a single dynamic signaling communication, an indication to activate one or more coverage enhancement parameters. The UE may activate the one or more coverage enhancement parameters based at least in
(Continued)

part on receiving the indication. Numerous other aspects are provided.

30 Claims, 11 Drawing Sheets

(51) Int. Cl.
  *H04W 72/0446* (2023.01)
  *H04W 72/0453* (2023.01)
  *H04W 80/02* (2009.01)
  *H04W 72/1263* (2023.01)
  *H04W 72/23* (2023.01)
  *H04W 72/54* (2023.01)

(52) U.S. Cl.
  CPC ....... *H04W 72/1263* (2013.01); *H04W 72/23* (2023.01); *H04W 72/54* (2023.01); *H04W 80/02* (2013.01)

(56) References Cited

U.S. PATENT DOCUMENTS

| | | | |
|---|---|---|---|
| 2017/0272895 A1* | 9/2017 | Park | H04B 7/26 |
| 2018/0007667 A1* | 1/2018 | You | H04L 5/0051 |
| 2018/0146438 A1* | 5/2018 | Yi | H04W 52/24 |
| 2018/0234227 A1* | 8/2018 | Zhang | H04L 27/2602 |
| 2019/0045554 A1* | 2/2019 | Ye | H04W 74/0833 |
| 2020/0022125 A1* | 1/2020 | Li | H04W 72/02 |
| 2020/0022149 A1* | 1/2020 | Beale | H04W 72/53 |
| 2020/0022218 A1* | 1/2020 | Chang | H04W 88/06 |
| 2020/0396772 A1* | 12/2020 | Tirronen | H04W 4/38 |
| 2021/0058823 A1* | 2/2021 | Liu | H04L 5/0053 |
| 2022/0078801 A1* | 3/2022 | Huang | H04W 76/15 |
| 2022/0141887 A1* | 5/2022 | Ahn | H04W 4/70 370/329 |
| 2022/0190902 A1* | 6/2022 | Zhang | H04W 56/001 |
| 2022/0386383 A1* | 12/2022 | Li | H04W 74/0833 |
| 2023/0010322 A1* | 1/2023 | Kurita | H04L 1/189 |
| 2023/0148282 A1* | 5/2023 | Marinier | H04W 72/0446 370/329 |
| 2023/0275717 A1* | 8/2023 | Yao | H04L 5/0048 370/329 |

OTHER PUBLICATIONS

International Search Report and Written Opinion—PCT/US2021/070392—ISA/EPO—dated Aug. 2, 2021.

* cited by examiner

TECHNIQUES FOR DYNAMIC SIGNALING FOR WIRELESS COVERAGE ENHANCEMENT

CROSS-REFERENCE TO RELATED APPLICATION

This patent application claims priority to U.S. Provisional Patent Application No. 63/018,928, filed on May 1, 2020, entitled "TECHNIQUES FOR DYNAMIC SIGNALING FOR WIRELESS COVERAGE ENHANCEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques for dynamic signaling for wireless coverage enhancement.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, in a single dynamic signaling communication, an indication to activate one or more coverage enhancement parameters, wherein the one or more coverage enhancement parameters include at least one of a repetition parameter, a frequency resource allocation parameter, a time resource allocation parameter, or a payload size parameter; and activating the one or more coverage enhancement parameters based at least in part on receiving the indication.

In some aspects, receiving the indication to activate the one or more coverage enhancement parameters includes receiving the indication to activate the one or more coverage enhancement parameters in a downlink control information (DCI) communication or a medium access control control element (MAC-CE) communication. In some aspects, the one or more coverage enhancement parameters are one or more UE-specific coverage enhancement parameters, and receiving the indication to activate the one or more coverage enhancement parameters includes receiving an indication to activate the one or more UE-specific coverage enhancement parameters.

In some aspects, the one or more coverage enhancement parameters are one or more group-common coverage enhancement parameters, and transmitting the indication to activate the one or more coverage enhancement parameters includes receiving an indication to activate the one or more group-common coverage enhancement parameters. In some aspects, the method includes receiving an indication of the one or more group-common coverage enhancement parameters in a UE-specific radio resource control (RRC) communication, and receiving the indication to activate the one or more group-common coverage enhancement parameters includes receiving the indication to activate the one or more group-common coverage enhancement parameters is included in a group-common physical downlink control channel (GC-PDCCH) communication.

In some aspects, the indication to activate the one or more group-common coverage enhancement parameters is included in a GC-PDCCH communication, and the method includes receiving an indication of the one or more group-common coverage enhancement parameters in a search space configuration for DCI associated with the GC-PDCCH communication. In some aspects, the method includes deactivating the one or more coverage enhancement parameters based at least in part on expiration of a timer associated with the one or more coverage enhancement parameters.

In some aspects, the method includes receiving an indication to deactivate the one or more coverage enhancement parameters, wherein the communication comprises at least one of a communication that explicitly indicates that the one or more coverage enhancement parameters are to be deactivated, a communication that explicitly indicates that the one or more coverage enhancement parameters are to be deactivated after a time duration, or a beam switch command. In some aspects, the one or more coverage enhancement parameters are configured for at least one of channel state information (CSI) reporting, physical downlink control channel (PDCCH) communication, physical uplink control channel (PUCCH) communication, semi-persistent scheduling, or configured grant scheduling. In some aspects, receiving the indication to activate the one or more coverage enhancement parameters includes receiving the indication to activate the one or more coverage enhancement parameters based at least in part on beam performance, of one more narrow beams on which the UE communicates with a BS, not satisfying a performance threshold.

In some aspects, a method of wireless communication, performed by a BS, may include determining to activate one or more coverage enhancement parameters for the one or more UEs, wherein the one or more coverage enhancement parameters include at least one of a repetition parameter, a frequency resource allocation parameter, a time resource allocation parameter, or a payload size parameter; and transmitting, to the one or more UEs and based at least in part on the determination to activate the one or more coverage enhancement parameters, a single dynamic communication indicating to activate the one or more coverage enhancement parameters.

In some aspects, transmitting the indication to activate the one or more coverage enhancement parameters comprises: transmitting the indication to activate the one or more coverage enhancement parameters in a DCI communication, or a MAC-CE communication. In some aspects, the one or more coverage enhancement parameters are one or more UE-specific coverage enhancement parameters, and transmitting the indication to activate the one or more coverage enhancement parameters comprises: transmitting an indication to activate the one or more UE-specific coverage enhancement parameters to a single UE.

In some aspects, the one or more coverage enhancement parameters are one or more group-common coverage enhancement parameters, and transmitting the indication to activate the one or more coverage enhancement parameters includes transmitting an indication to activate the one or more group-common coverage enhancement parameters to a plurality of UEs. In some aspects, the method includes transmitting, to each UE of the plurality of UEs, an indication of the one or more group-common coverage enhancement parameters in respective UE-specific RRC communications, wherein the indication to is activating the one or more group-common coverage enhancement parameters is included in a GC-PDCCH communication.

In some aspects, the indication to activate the one or more group-common coverage enhancement parameters is included in a GC-PDCCH communication, and the method includes transmitting, to the plurality of UEs, an indication of the one or more group-common coverage enhancement parameters in a search space configuration for DCI associated with the GC-PDCCH communication. In some aspects, the one or more coverage enhancement parameters are active until expiration of a timer associated with the one or more coverage enhancement parameters.

In some aspects, the method includes transmitting, to the one or more UEs, a communication that deactivates the one or more coverage enhancement parameters, where the communication comprises at least one of a communication that explicitly indicates that the one or more coverage enhancement parameters are deactivated, a communication that explicitly indicates that the one or more coverage enhancement parameters are to be deactivated after a time duration, or a beam switch command.

In some aspects, determining that the beam performance of the one or more narrow beams does not satisfy the performance threshold includes determining that the beam performance of the one or more narrow beams does not satisfy the performance threshold based at least in part on at least one of one or more CSI reports received from at least a subset of the one or more UEs, one or more hybrid automatic repeat request (HARD) feedback communications received from at least a subset of the one or more UEs, or uplink reception quality associated with at least a subset of the one or more UEs. In some aspects, the one or more coverage enhancement parameters are configured for at least one of CSI reporting, PDCCH communication, PUCCH communication, semi-persistent scheduling, or configured grant scheduling.

In some aspects, the method includes identifying the one or more coverage enhancement parameters from a plurality of candidate coverage enhancement parameters configured for one or more physical channel types or one or more communication procedure types. In some aspects, the method includes determining that beam performance of one or more narrow beams, on which the BS communicates with the one or more UEs, does not satisfy a performance threshold; and determining to activate the one or more coverage enhancement parameters for the one or more UEs includes determining to activate the one or more coverage enhancement parameters for the one or more UEs based at least in part on the determination that the beam performance of the one or more narrow beams does not satisfy the performance threshold.

In some aspects, a UE for wireless communication may include a memory and one or more processors coupled to the memory. The memory and the one or more processors may be configured to receive, in a single dynamic signaling communication, an indication to activate one or more coverage enhancement parameters, wherein the one or more coverage enhancement parameters include at least one of a repetition parameter, a frequency resource allocation parameter, a time resource allocation parameter, or a payload size parameter; and activate the one or more coverage enhancement parameters based at least in part on receiving the indication.

In some aspects, the one or more processors, when receiving the indication to activate the one or more coverage enhancement parameters, are configured to receive the indication to activate the one or more coverage enhancement parameters in a DCI communication or a MAC-CE communication. In some aspects, the one or more coverage enhancement parameters are one or more UE-specific coverage enhancement parameters, and the one or more processors, when receiving the indication to activate the one or more coverage enhancement parameters, are configured to receive an indication to activate the one or more UE-specific coverage enhancement parameters.

In some aspects, the one or more coverage enhancement parameters are one or more group-common coverage enhancement parameters, and the one or more processors, when transmitting the indication to activate the one or more coverage enhancement parameters, are configured to receive an indication to activate the one or more group-common coverage enhancement parameters. In some aspects, the one or more processors are further configured to receive an indication of the one or more group-common coverage enhancement parameters in a UE-specific RRC communication, and the one or more processors, when receiving the indication to activate the one or more group-common coverage enhancement parameters, are configured to receive the indication to activate the one or more group-common coverage enhancement parameters in a GC-PDCCH communication.

In some aspects, the indication to activate the one or more group-common coverage enhancement parameters is included in a GC-PDCCH communication, and the one or more processors are further configured to receive an indication of the one or more group-common coverage enhancement parameters in a search space configuration for DCI associated with the GC-PDCCH communication. In some aspects, the one or more processors are further configured to deactivate the one or more coverage enhancement parameters based at least in part on expiration of a timer associated with the one or more coverage enhancement parameters.

In some aspects, the one or more processors are further configured to receive an indication to deactivate the one or more coverage enhancement parameters, and the communication comprises at least one of a communication that explicitly indicates that the one or more coverage enhancement parameters are to be deactivated, a communication that explicitly indicates that the one or more coverage enhancement parameters are to be deactivated after a time duration, or a beam switch command. In some aspects, the one or more coverage enhancement parameters are configured for at least one of CSI reporting, PDCCH communication, PUCCH communication, semi-persistent scheduling, or configured grant scheduling. In some aspects, the one or more processors, when receiving the indication to activate the one or more coverage enhancement parameters, are configured to receive the indication to activate the one or more coverage enhancement parameters based at least in part on beam performance, of one more narrow beams on which the UE communicates with a BS, not satisfying a performance threshold.

In some aspects, a BS for wireless communication may include a memory and one or more processors coupled to the memory. The memory and the one or more processors may be configured to determine to activate one or more coverage enhancement parameters for the one or more UEs, wherein the one or more coverage enhancement parameters include at least one of a repetition parameter, a frequency resource allocation parameter, a time resource allocation parameter, or a payload size parameter; and transmit, to the one or more UEs and based at least in part on the determination to activate the one or more coverage enhancement parameters, a single dynamic communication indicating to activate the one or more coverage enhancement parameters.

In some aspects, the one or more processors, when transmitting the indication to activate the one or more coverage enhancement parameters, are configured to transmit the indication to activate the one or more coverage enhancement parameters in a DCI communication or a MAC-CE communication. In some aspects, the one or more coverage enhancement parameters are one or more UE-specific coverage enhancement parameters, and the one or more processors, when transmitting the indication to activate the one or more coverage enhancement parameters, are configured to transmit an indication to activate the one or more UE-specific coverage enhancement parameters to a single UE.

In some aspects, the one or more coverage enhancement parameters are one or more group-common coverage enhancement parameters, and the one or more processors, when transmitting the indication to activate the one or more coverage enhancement parameters, are configured to transmit an indication to activate the one or more group-common coverage enhancement parameters to a plurality of UEs. In some aspects, the one or more processors are further configured to transmit, to each UE of the plurality of UEs, an indication of the one or more group-common coverage enhancement parameters in respective UE-specific radio resource control (RRC) communications, the indication to activate the one or more group-common coverage enhancement parameters being included in a GC-PDCCH communication.

In some aspects, the indication to activate the one or more group-common coverage enhancement parameters is included in a GC-PDCCH communication, and the one or more processors are further configured to transmit, to the plurality of UEs, an indication of the one or more group-common coverage enhancement parameters in a search space configuration for DCI associated with the GC-PDCCH communication. In some aspects, the one or more coverage enhancement parameters are active until expiration of a timer associated with the one or more coverage enhancement parameters.

In some aspects, the one or more processors are further configured to transmit, to the one or more UEs, a communication that deactivates the one or more coverage enhancement parameters, where the communication comprises at least one of a communication that explicitly indicates that the one or more coverage enhancement parameters are deactivated, a communication that explicitly indicates that the one or more coverage enhancement parameters are to be deactivated after a time duration, or a beam switch command. In some aspects, the one or more processors, when determining that the beam performance of the one or more narrow beams does not satisfy the performance threshold, are configured to determine that the beam performance of the one or more narrow beams does not satisfy the performance threshold based at least in part on at least one of: one or more CSI reports received from at least a subset of the one or more UEs, one or more HARQ feedback communications received from at least a subset of the one or more UEs, or uplink reception quality associated with at least a subset of the one or more UEs.

In some aspects, the one or more coverage enhancement parameters are configured for at least one of CSI reporting, PDCCH communication, PUCCH communication, semi-persistent scheduling, or configured grant scheduling. In some aspects, the one or more processors are further configured to identify the one or more coverage enhancement parameters from a plurality of candidate coverage enhancement parameters configured for one or more physical channel types or one or more communication procedure types. In some aspects, the one or more processors are further configured to determine that beam performance of one or more narrow beams, on which the BS communicates with the one or more UEs, does not satisfy a performance threshold; and the one or more processors, when determining to activate the one or more coverage enhancement parameters for the one or more UEs, are configured to determine to activate the one or more coverage enhancement parameters for the one or more UEs based at least in part on the determination that the beam performance of the one or more narrow beams does not satisfy the performance threshold.

In some aspects, a non-transitory computer-readable medium may store one or more instructions for wireless communication. The one or more instructions, when executed by one or more processors of a UE, may cause the one or more processors to receive, in a single dynamic signaling communication, an indication to activate one or more coverage enhancement parameters, wherein the one or more coverage enhancement parameters include at least one of a repetition parameter, a frequency resource allocation parameter, a time resource allocation parameter, or a payload size parameter; and activate the one or more coverage enhancement parameters based at least in part on receiving the indication.

In some aspects, the one or more instructions, that cause the one or more processors to receive the indication to activate the one or more coverage enhancement parameters, cause the one or more processors to receive the indication to activate the one or more coverage enhancement parameters in a DCI communication or a MAC-CE communication. In some aspects, the one or more coverage enhancement parameters are one or more UE-specific coverage enhancement parameters, and the one or more instructions, that cause the one or more processors to receive the indication to activate the one or more coverage enhancement parameters, cause the one or more processors to receive an indication to activate the one or more UE-specific coverage enhancement parameters.

In some aspects, the one or more coverage enhancement parameters are one or more group-common coverage enhancement parameters, and the one or more instructions, that cause the one or more processors to transmit the indication to activate the one or more coverage enhancement parameters, cause the one or more processors to receive an indication to activate the one or more group-common coverage enhancement parameters. In some aspects, the one or more instructions, when executed by the one or more processors, further cause the one or more processors to receive an indication of the one or more group-common coverage enhancement parameters in a UE-specific RRC communication, and the one or more instructions, that cause the one or more processors to receive the indication to activate the one or more group-common coverage enhancement parameters, cause the one or more processors to receive the indication to activate the one or more group-common coverage enhancement parameters in a GC-PDCCH communication.

In some aspects, the indication to activate the one or more group-common coverage enhancement parameters is included in a GC-PDCCH communication, and the one or more instructions, when executed by the one or more processors, further cause the one or more processors to receive an indication of the one or more group-common coverage enhancement parameters in a search space configuration for DCI associated with the GC-PDCCH communication. In some aspects, the one or more instructions, when executed by the one or more processors, further cause the one or more processors to deactivate the one or more coverage enhancement parameters based at least in part on expiration of a timer associated with the one or more coverage enhancement parameters.

In some aspects, the one or more instructions, when executed by the one or more processors, further cause the one or more processors to receive an indication to deactivate the one or more coverage enhancement parameters, and the communication comprises at least one of a communication that explicitly indicates that the one or more coverage enhancement parameters are to be deactivated, a communication that explicitly indicates that the one or more coverage enhancement parameters are to be deactivated after a time duration, or a beam switch command. In some aspects, the one or more coverage enhancement parameters are configured for at least one of CSI reporting, PDCCH communication, PUCCH communication, semi-persistent scheduling, or configured grant scheduling. In some aspects, the one or more instructions, that cause the one or more processors to receive the indication to activate the one or more coverage enhancement parameters, cause the one or more processors to receive the indication to activate the one or more coverage enhancement parameters based at least in part on beam performance, of one more narrow beams on which the UE communicates with a BS, not satisfying a performance threshold.

In some aspects, a non-transitory computer-readable medium may store one or more instructions for wireless communication. The one or more instructions, when executed by one or more processors of a BS, may cause the one or more processors to determine to activate one or more coverage enhancement parameters for the one or more UEs, wherein the one or more coverage enhancement parameters include at least one of a repetition parameter, a frequency resource allocation parameter, a time resource allocation parameter, or a payload size parameter; and transmit, to the one or more UEs and based at least in part on the determination to activate the one or more coverage enhancement parameters, a single dynamic communication indicating to activate the one or more coverage enhancement parameters.

In some aspects, the one or more instructions, that cause the one or more processors to transmit the indication to activate the one or more coverage enhancement parameters, cause the one or more processors to transmit the indication to activate the one or more coverage enhancement parameters in a DCI communication or a MAC-CE communication. In some aspects, the one or more coverage enhancement parameters are one or more UE-specific coverage enhancement parameters, and the one or more instructions, that cause the one or more processors to transmit the indication to activate the one or more coverage enhancement parameters, cause the one or more processors to transmit an indication to activate the one or more UE-specific coverage enhancement parameters to a single UE.

In some aspects, the one or more coverage enhancement parameters are one or more group-common coverage enhancement parameters, and the one or more instructions, that cause the one or more processors to transmit the indication to activate the one or more coverage enhancement parameters, cause the one or more processors to transmit an indication to activate the one or more group-common coverage enhancement parameters to a plurality of UEs. In some aspects, the one or more instructions, when executed by the one or more processors, further cause the one or more processors to transmit, to each UE of the plurality of UEs, an indication of the one or more group-common coverage enhancement parameters in respective UE-specific RRC communications, and the indication to activate the one or more group-common coverage enhancement parameters is included in a GC-PDCCH communication.

In some aspects, the indication to activate the one or more group-common coverage enhancement parameters is included in a GC-PDCCH communication, and the one or more instructions, when executed by the one or more processors, further cause the one or more processors to transmit, to the plurality of UEs, an indication of the one or more group-common coverage enhancement parameters in a search space configuration for DCI associated with the GC-PDCCH communication.

In some aspects the one or more coverage enhancement parameters are active until expiration of a timer associated with the one or more coverage enhancement parameters. In some aspects, the one or more instructions, when executed by the one or more processors, further cause the one or more processors to transmit, to the one or more UEs, a communication that deactivates the one or more coverage enhancement parameters, and the communication comprises at least one of a communication that explicitly indicates that the one or more coverage enhancement parameters are deactivated, a communication that explicitly indicates that the one or more coverage enhancement parameters are to be deactivated after a time duration, or a beam switch command.

In some aspects, the one or more instructions, that cause the one or more processors to determine that the beam performance of the one or more narrow beams does not satisfy the performance threshold, cause the one or more processors to determine that the beam performance of the one or more narrow beams does not satisfy the performance threshold based at least in part on at least one of one or more CSI reports received from at least a subset of the one or more UEs, one or more HARQ feedback communications received from at least a subset of the one or more UEs, or uplink reception quality associated with at least a subset of the one or more UEs. In some aspects, the one or more coverage enhancement parameters are configured for at least one of CSI reporting, PDCCH communication, PUCCH communication, semi-persistent scheduling, or configured grant scheduling.

In some aspects, the one or more instructions, when executed by the one or more processors, further cause the one or more processors to identify the one or more coverage enhancement parameters from a plurality of candidate coverage enhancement parameters configured for one or more physical channel types or one or more communication procedure types. In some aspects, the one or more instructions, when executed by the one or more processors, further cause the one or more processors to determine that beam performance of one or more narrow beams, on which the BS communicates with the one or more UEs, does not satisfy a performance threshold; and the one or more processors, when the one or more instructions, that cause the one or more processors to determine to activate the one or more coverage enhancement parameters for the one or more UEs, cause the one or more processors to determine to activate the one or more coverage enhancement parameters for the one or more UEs based at least in part on the determination that the beam performance of the one or more narrow beams does not satisfy the performance threshold.

In some aspects, an apparatus for wireless communication may include means for receiving, in a single dynamic signaling communication, an indication to activate one or more coverage enhancement parameters, wherein the one or more coverage enhancement parameters include at least one of a repetition parameter, a frequency resource allocation parameter, a time resource allocation parameter, or a payload size parameter; and means for activating the one or more coverage enhancement parameters based at least in part on receiving the indication.

In some aspects, the means for receiving the indication to activate the one or more coverage enhancement parameters comprises means for receiving the indication to activate the one or more coverage enhancement parameters in a DCI communication or a MAC-CE communication. In some aspects, the one or more coverage enhancement parameters are one or more UE-specific coverage enhancement parameters, and the means for receiving the indication to activate the one or more coverage enhancement parameters comprises means for receiving an indication to activate the one or more UE-specific coverage enhancement parameters.

In some aspects, the one or more coverage enhancement parameters are one or more group-common coverage enhancement parameters, and the means for transmitting the indication to activate the one or more coverage enhancement parameters comprises means for receiving an indication to activate the one or more group-common coverage enhancement parameters. In some aspects, the apparatus further comprises means for receiving an indication of the one or more group-common coverage enhancement parameters in a UE-specific RRC communication, and the means for receiving the indication to activate the one or more group-common coverage enhancement parameters comprises means for receiving the indication to activate the one or more group-common coverage enhancement parameters in a GC-PDCCH communication.

In some aspects, the indication to activate the one or more group-common coverage enhancement parameters is included in a GC-PDCCH communication, and the apparatus further comprises means for receiving an indication of the one or more group-common coverage enhancement parameters in a search space configuration for DCI associated with the GC-PDCCH communication. In some aspects, the apparatus further comprises means for deactivating the one or more coverage enhancement parameters based at least in part on expiration of a timer associated with the one or more coverage enhancement parameters. In some aspects, the apparatus further comprises means for receiving an indication to deactivate the one or more coverage enhancement parameters, and the communication comprises at least one of a communication that explicitly indicates that the one or more coverage enhancement parameters are to be deactivated, a communication that explicitly indicates that the one or more coverage enhancement parameters are to be deactivated after a time duration, or a beam switch command.

In some aspects, the one or more coverage enhancement parameters are configured for at least one of CSI reporting, PDCCH communication, PUCCH communication, semi-persistent scheduling, or configured grant scheduling. In some aspects, the means for receiving the indication to activate the one or more coverage enhancement parameters includes means for receiving the indication to activate the one or more coverage enhancement parameters based at least in part on beam performance, of one more narrow beams on which the apparatus communicates with a BS, not satisfying a performance threshold.

In some aspects, an apparatus for wireless communication may include means for determining to activate one or more coverage enhancement parameters for the one or more UEs, wherein the one or more coverage enhancement parameters include at least one of a repetition parameter, a frequency resource allocation parameter, a time resource allocation parameter, or a payload size parameter; and means for transmitting, to the one or more UEs and based at least in part on the determination to activate the one or more coverage enhancement parameters, a single dynamic communication indicating to activate the one or more coverage enhancement parameters.

In some aspects, the means for transmitting the indication to activate the one or more coverage enhancement parameters comprises means for transmitting the indication to activate the one or more coverage enhancement parameters in a DCI communication or a MAC-CE communication. In some aspects, the one or more coverage enhancement parameters are one or more UE-specific coverage enhancement parameters, and the means for transmitting the indication to activate the one or more coverage enhancement parameters comprises means for transmitting an indication to activate the one or more UE-specific coverage enhancement parameters to a single UE.

In some aspects, the one or more coverage enhancement parameters are one or more group-common coverage enhancement parameters, and the means for transmitting the indication to activate the one or more coverage enhancement parameters comprises means for transmitting an indication to activate the one or more group-common coverage enhancement parameters to a plurality of UEs. In some aspects, the apparatus comprises means for transmitting, to each UE of the plurality of UEs, an indication of the one or more group-common coverage enhancement parameters in respective UE-specific RRC communications, the indication to activate the one or more group-common coverage enhancement parameters being included in a GC-PDCCH communication.

In some aspects, the indication to activate the one or more group-common coverage enhancement parameters is included in a GC-PDCCH communication, and the apparatus further comprises means for transmitting, to the plurality of UEs, an indication of the one or more group-common coverage enhancement parameters in a search space configuration for DCI associated with the GC-PDCCH communication. In some aspects, the one or more coverage enhancement parameters are active until expiration of a timer associated with the one or more coverage enhancement parameters.

In some aspects, the apparatus comprises means for transmitting, to the one or more UEs, a communication that deactivates the one or more coverage enhancement parameters, and the communication comprises at least one of a communication that explicitly indicates that the one or more coverage enhancement parameters are deactivated, a communication that explicitly indicates that the one or more coverage enhancement parameters are to be deactivated after a time duration, or a beam switch command.

In some aspects, the means for determining that the beam performance of the one or more narrow beams does not satisfy the performance threshold comprises means for determining that the beam performance of the one or more narrow beams does not satisfy the performance threshold based at least in part on at least one of one or more CSI reports received from at least a subset of the one or more UEs, one or more HARQ feedback communications received from at least a subset of the one or more UEs, or uplink reception quality associated with at least a subset of the one or more UEs. In some aspects, the one or more coverage enhancement parameters are configured for at least one of CSI reporting, PDCCH communication, PUCCH communication, semi-persistent scheduling, or configured grant scheduling.

In some aspects, the apparatus comprises means for identifying the one or more coverage enhancement parameters from a plurality of candidate coverage enhancement parameters configured for one or more physical channel types or one or more communication procedure types. In some aspects, the apparatus further includes means for determining that beam performance of one or more narrow beams, on which the BS communicates with the one or more UEs, does not satisfy a performance threshold; and the means for determining to activate the one or more coverage enhancement parameters for the one or more UEs includes means for determining to activate the one or more coverage enhancement parameters for the one or more UEs based at least in part on the determination that the beam performance of the one or more narrow beams does not satisfy the performance threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
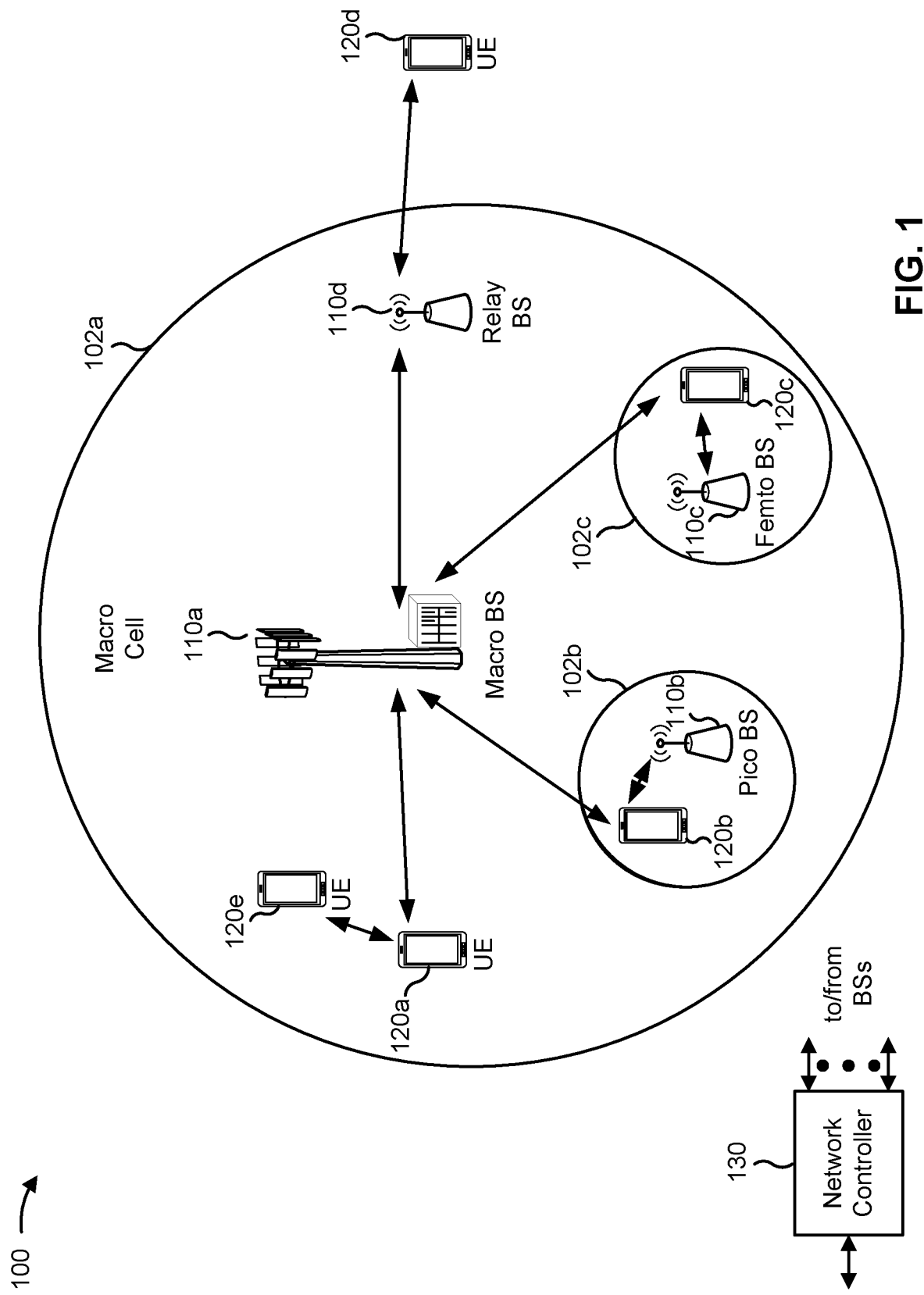
FIG. 1 is a diagram illustrating an example of a wireless network, in accordance with the present disclosure.

FIG. 1 is a diagram illustrating an example of a wireless network 100 in accordance which the present disclosure. The wireless network 100 may be or may include elements of a 5G (NR) network and/or an LTE network, among other examples. The wireless network 100 may include a number of base stations (BSs) 110 (shown as BS 110a, BS 110b, BS 110c, and BS 110d) and other network entities. ABS is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
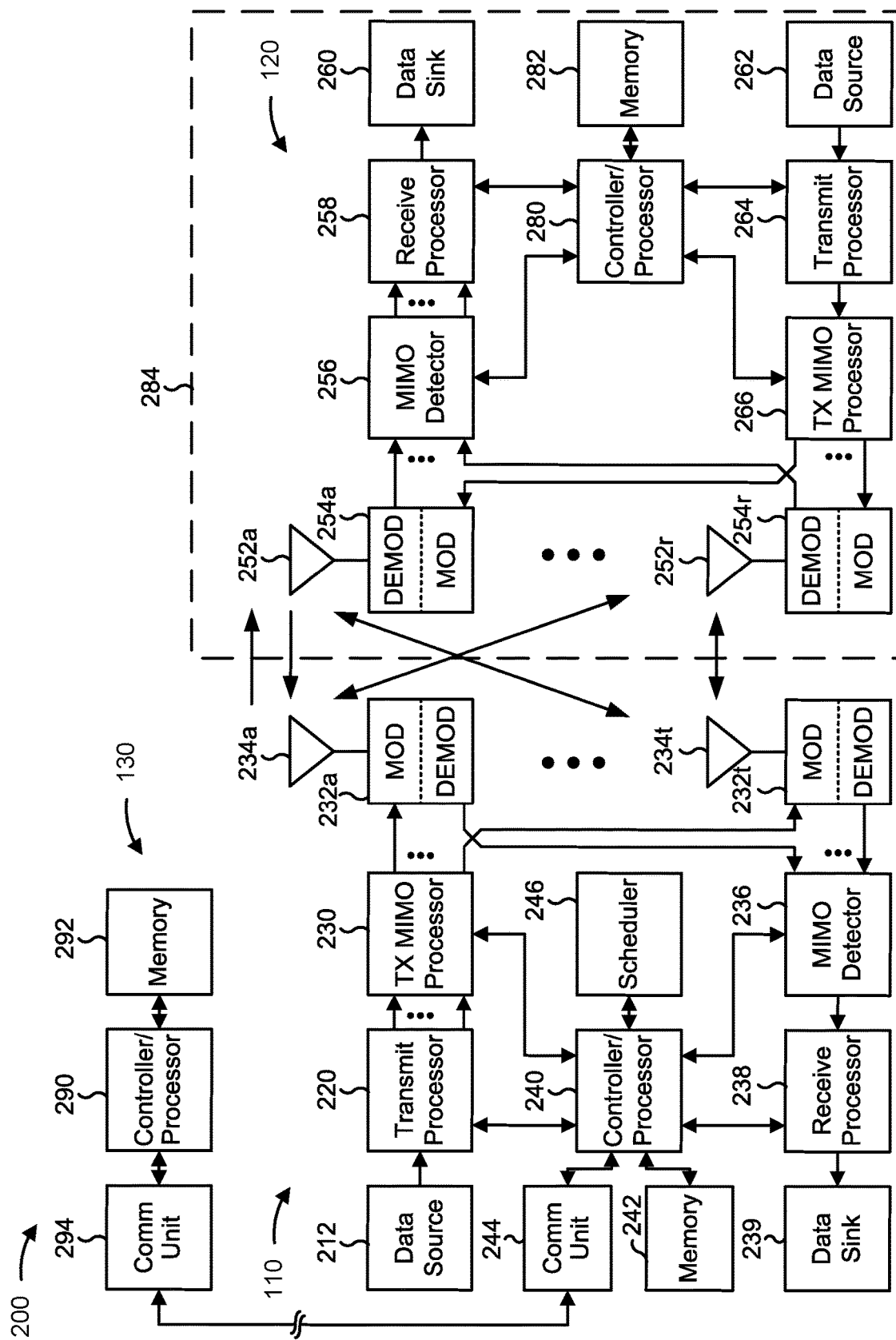
FIG. 2 is a diagram illustrating an example of a base station (BS) in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with dynamic signaling for wireless coverage enhancement, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions. A scheduler 246 may schedule UEs for data transmission on the downlink and/or uplink.

In some aspects, UE 120 may include means for receiving, in a single dynamic signaling communication, an indication to activate one or more coverage enhancement parameters, means for activating the one or more coverage enhancement parameters based at least in part on receiving the indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for determining to activate one or more coverage enhancement parameters for the one or more UEs 120, means for transmitting, to the one or more UEs 120 and based at least in part on the determination to activate the one or more coverage enhancement parameters, a single dynamic communication indicating to activate the one or more coverage enhancement parameters, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless network, a BS and a UE may communicate on narrow beams, which may be beams that are refined from (and narrow relative to) a wide beam associated with the BS. In some cases, the UE and the BS may communicate on a narrow beam pair, which may include a narrow transmit beam and a narrow receive beam. In these cases, the BS may transmit downlink communications to the UE using a narrow transmit beam and may receive uplink communications from the UE using a narrow receive beam. Similarly, the UE may transmit uplink communications to the BS using a narrow transmit beam and may receive downlink communications from the BS using a narrow receive beam.

Beam reliability of a narrow beam may impact coverage for unicast channels, particular in higher-bandwidth frequency ranges in 5G NR such as Frequency Range 2 (FR2) and/or the like. In some cases, a UE may experience degraded or worsening beam performance on one or more narrow beams (e.g., due to a beam blockage, due to partial shadowing, and/or the like). Moreover, other UEs that share the same narrow beam and/or or that communicate on another narrow beam that is correlated with the narrow beam (e.g., as being refined from the same wide beam) may experience similar degradations.

Some aspects described herein provide techniques and apparatuses for dynamic signaling for wireless coverage enhancement. In some aspects, a BS (e.g., a BS 110) may be capable of signaling coverage enhancement parameters to one or more UEs (e.g., UEs 120 that experience degraded or worsening beam performance on one or more narrow beams, or UEs 120 in other communication scenarios). The BS may signal an activation of the coverage enhancement parameters in a single dynamic signaling communication to the one or more UEs, and the UEs may activate the coverage enhancement parameters and communicate on the one or more narrow beams based at least in part on the coverage enhancement parameters. In this way, the single dynamic signaling communication of the coverage enhancement parameters from the BS permits beam performance of the one or more narrow beams to be maintained or increased, while indicating the activation to the one or more UEs in a manner that conserves signaling overhead (which reduces radio resource consumption).

FIGS. 3A-3E are diagrams illustrating one or more examples 300 of dynamic signaling for wireless coverage enhancement, in accordance with the present disclosure. As shown in FIGS. 3A-3E, example(s) 300 include communication between a BS 110 (e.g., the BS 110 illustrated and described above in connection with FIGS. 1 and/or 2) and one or more UEs 120 (e.g., UEs 120 illustrated and described above in connection with FIGS. 1 and/or 2). The BS 110 and the one or more UEs 120 may be included in a wireless network such as wireless network 100. The BS 110 and the one or more UEs 120 may communicate on a wireless access link, which may include an uplink and a downlink. While FIGS. 3A-3E illustrate example(s) 300 including UE1-UEn, example(s) 300 may include a single UE, or a different quantity of UEs than what is shown in FIGS. 3A-3E.

Figure 3A:
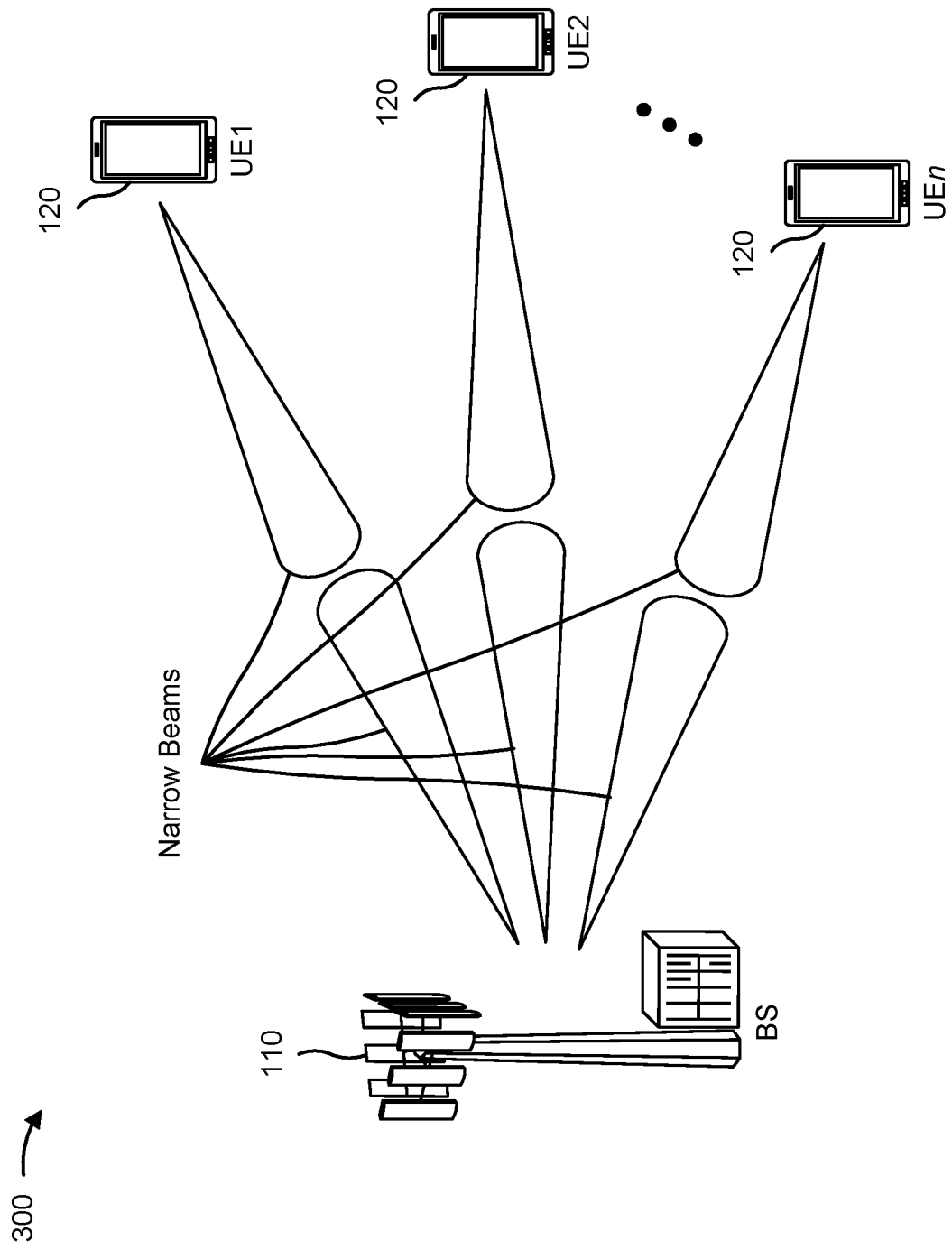
FIGS. 3A-3E are diagrams illustrating one or more examples of dynamic signaling for wireless coverage enhancement, in accordance with the present disclosure.

As shown in FIG. 3A, the BS 110 and the one or more UEs 120 may communicate on narrow beams, which may be beams that are refined from (and narrow relative to) a wide beam associated with the BS 110. In some aspects, each UE 120 and the BS 110 communicate on a narrow beam pair, which may include a narrow transmit beam and a narrow receive beam. In these cases, the BS 110 may transmit downlink communications to a UE 120 using a narrow transmit beam and may receive uplink communications from a UE 120 using a narrow receive beam. Similarly, a UE 120 may transmit uplink communications to the BS 110 using a narrow transmit beam and may receive downlink communications from the BS 110 using a narrow receive beam.

Figure 3B:
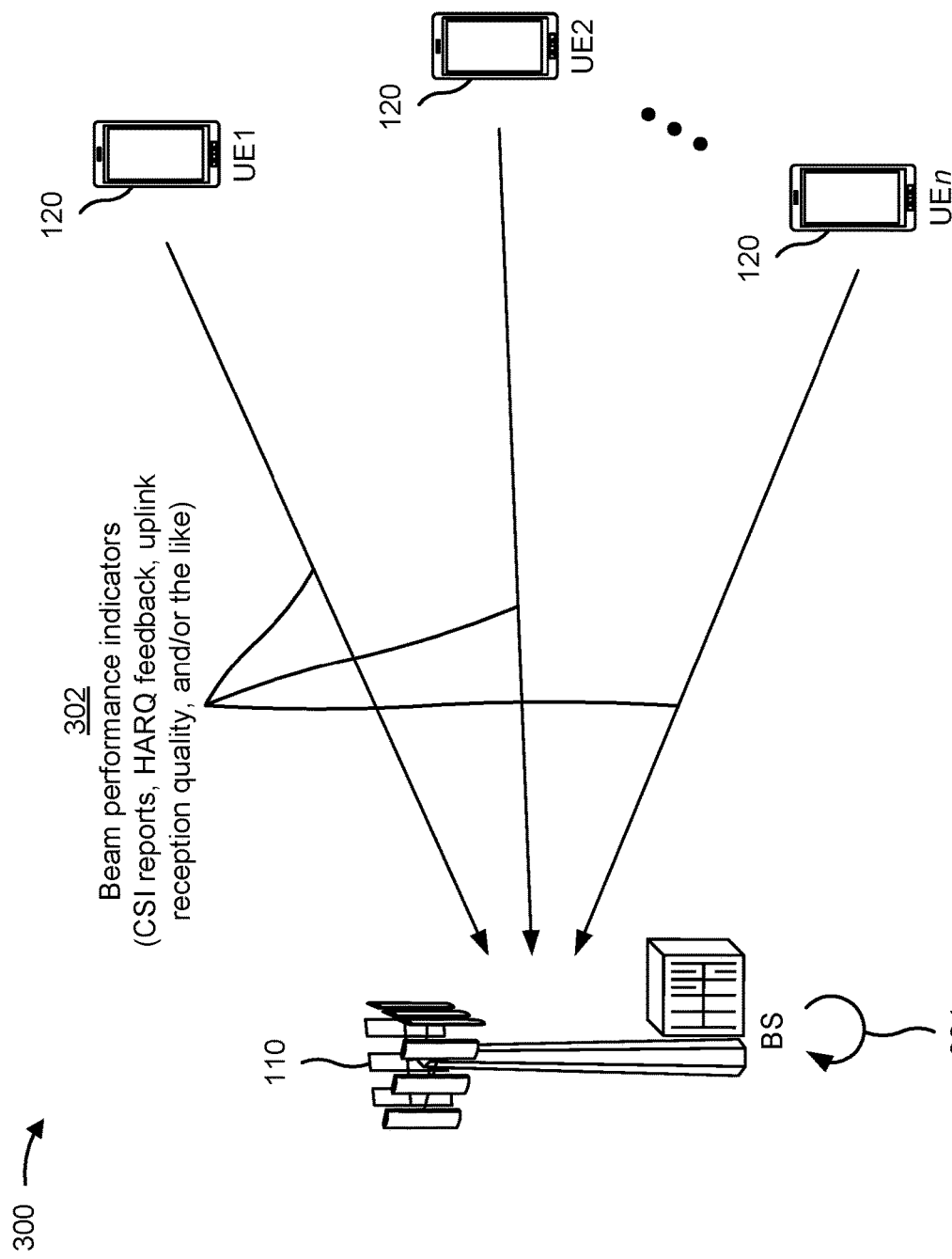

As shown in FIG. 3B, and by reference number 302, a UE 120 (or each UE 120) of the one or more UEs 120 may transmit an indication of one or more beam performance indicators to the BS 110. In some aspects, the UE 120 transmits the indication of the one or more beam performance indicators based at least in part on receiving a request for the one or more beam performance indicators from the BS 110. In some aspects, the UE 120 transmits the indication of the one or more beam performance indicators periodically at a particular time interval.

The one or more beam performance indicators may be beam performance indicators associated with one or more narrow beams of the BS 110 and/or the UE 120, such as a narrow transmit beam of the BS 110, a narrow receive beam of the BS 110, a narrow transmit beam of the UE 120, a narrow receive beam of the UE 120, and/or the like. For example, the one or more beam performance indicators may include one or more channel state information (CSI) reports associated with the one or more narrow beams, hybrid automatic repeat request (HARQ) feedback associated with the one or more narrow beams (e.g., an acknowledgement (ACK) or negative ACK (NACK) for a downlink communication received from the BS 110 on a narrow transmit beam of the BS 110 and/or a narrow receive beam of the UE 120), an indication of uplink reception quality associated with the one or more narrow beams (e.g., one or more RSRP measurements, one or more RSRQ measurements, one or more RSSI measurements, one or more CQI measurements, and/or the like associated with a narrow transmit beam of the BS 110 and/or a narrow receive beam of the UE 120), and/or the like.

As further shown in FIG. 3B, and by reference number 304, the BS 110 may determine that beam performance of one or more narrow beams associated with the one or more UEs 120 does not satisfy a performance threshold. The performance threshold may be a measurement threshold (e.g., an RSRP measurement threshold, an RSRQ measurement threshold, and/or the like), may be a channel quality threshold (e.g., a CQI threshold), may be another type of threshold, or a combination thereof.

In some aspects, the BS 110 determines that the beam performance of the one or more narrow beams associated with the one or more UEs 120 does not satisfy the performance threshold based at least in part on the indication of the beam performance indicators received from the one or more UEs 120. In some aspects, the BS 110 determines that the beam performance of the one or more narrow beams associated with the one or more UEs 120 does not satisfy the performance threshold based at least in part on statistics and/or trends in the beam performance indicators, such as a trend indicating that beam performance of the one or more narrow beams is degrading or worsening, that beam performance of the one or more narrow beams is degrading or worsening at a particular rate, and/or the like.

Figure 3C:
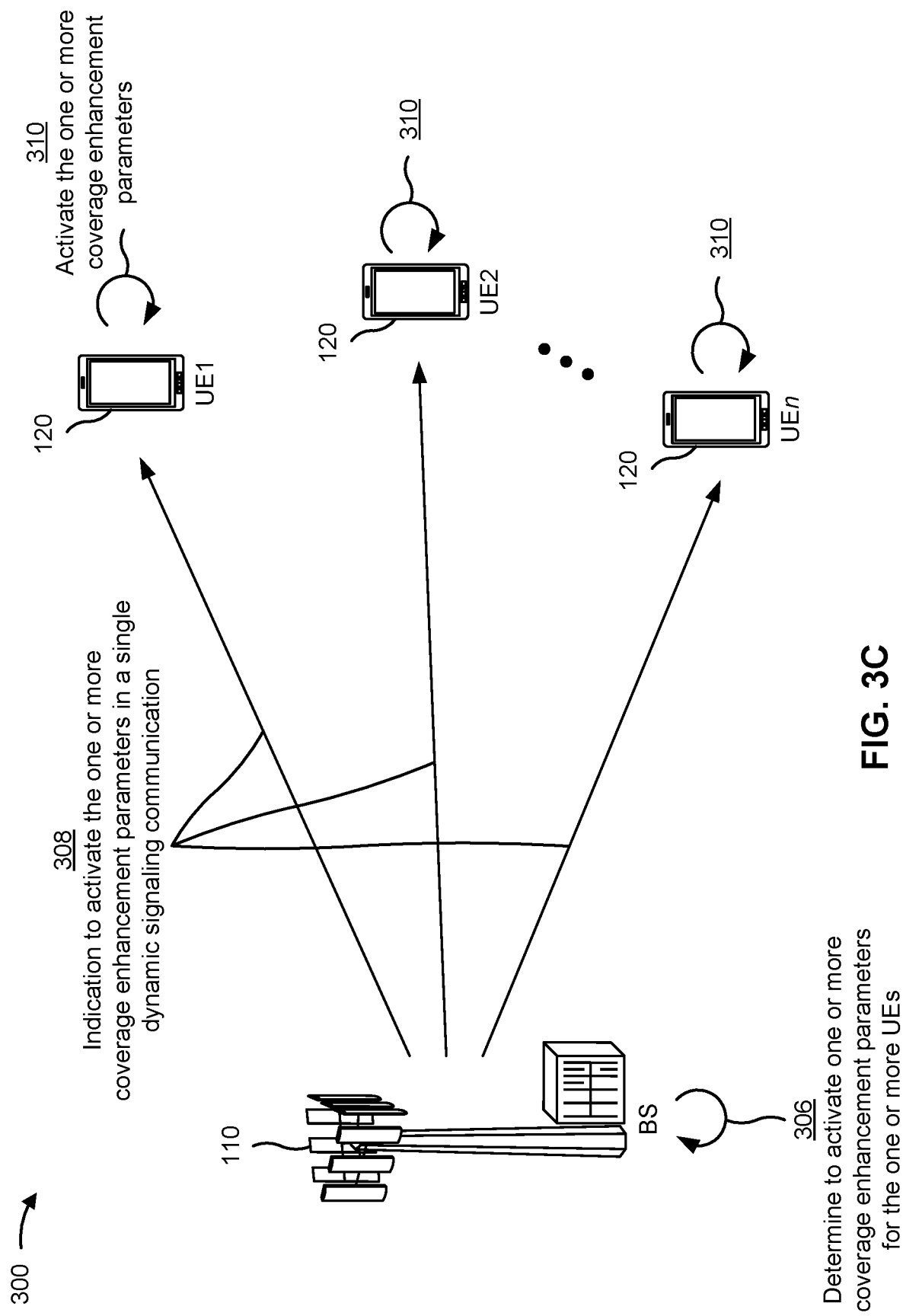

As shown in FIG. 3C, and by reference number 306, the BS 110 may determine to activate one or more coverage enhancement parameters. In some aspects, BS 100 may determine to activate one or more coverage enhancement parameters to mitigate the degraded or worsening beam performance of the one or more narrow beams associated with the one or more UEs 120, to maintain the beam performance of the one or more narrow beams associated with the one or more UEs 120, to increase the beam performance of the one or more narrow beams associated with the one or more UEs 120, and/or the like. In some aspects, the BS 110 determines to activate one or more coverage enhancement parameters based at least in part on determining that the beam performance of the one or more narrow beams associated with the one or more UEs 120 does not satisfy the performance threshold.

In some aspects, BS 110 may determine to activate one or more coverage enhancement parameters for other purposes that are related or unrelated to beam performance. For example, BS 110 may determine to activate one or more coverage enhancement parameters for various communication procedures, such as a random access channel procedure, or reference signal transmission and/or reporting. As another example, BS 110 may determine to activate one or more coverage enhancement parameters for particular types of UEs, such as reduced-capability UEs or IoT UEs, to account for and/or offset a reduced bandwidth capability, a reduced battery capability, and/or other UE capabilities. As another example, BS 110 may determine to activate one or more coverage enhancement parameters for highly mobile UEs.

In some aspects, the BS 110 identifies the one or more coverage enhancement parameters based at least in part on a UE 120. For example, the BS 110 may identify one or more UE-specific coverage enhancement parameters for a UE 120. In some aspects, the BS 110 identifies the one or more coverage enhancement parameters based at least in part on a group of UEs to which a UE 120 is associated. For example, the BS 110 may identify, for a UE 120, one or more group-common coverage enhancement parameters associated with a group of UEs to which a UE 120 is associated.

In some aspects, the BS 110 identifies a plurality of sets of one or more coverage enhancement parameters for a UE 120, where each set of one or more coverage enhancement parameters is associated with a particular physical channel time or communication process. For example, the BS 110 may identify a set of one or more coverage enhancement parameters for CSI reporting. As another example, the BS 110 may identify a set of one or more coverage enhancement parameters for physical downlink control channel (PDCCH) communication. As another example, the BS 110 may identify a set of one or more coverage enhancement parameters for physical downlink shared channel (PDSCH) communication. As another example, the BS 110 may identify a set of one or more coverage enhancement parameters for physical uplink control channel (PUCCH) communication. As another example, the BS 110 may identify a set of one or more coverage enhancement parameters for physical uplink shared channel (PUSCH) communication. As another example, the BS 110 may identify a set of one or more coverage enhancement parameters for transmitting and/or receiving semi-persistent scheduling (SPS) communications. As another example, the BS 110 may identify a set of one or more coverage enhancement parameters for transmitting and/or receiving configured grant communications. In some aspects, the BS 110 may identify one or more combinations of sets of one or more coverage enhancement parameters described above and/or other sets of one or more coverage enhancement parameters.

In some aspects, the BS 110 may identify configured coverage enhancement parameters or configured combinations of coverage enhancement parameters for particular UEs 120 (e.g., based at least in part on a UE capability), for particular groups of UEs 120 (e.g., based at least in part on a group type), for particular physical channel types, for a particular communication processes, and/or the like. In some aspects, configured coverage enhancement parameters or configured combinations of coverage enhancement parameters may be indicated in a table, a specification, a database, a wireless communication standard, and/or the like. In these cases, the BS 110 may identify the one or more coverage enhancement parameters from a plurality of candidate coverage enhancement parameters or candidate combinations of coverage enhancement parameters (e.g., for a UE 120, for a group of UEs 120, for a particular physical channel type, for a particular communication procedure type, and/or the like) identified in the table, the specification, the database, the wireless communication standard, and/or the like.

Examples of coverage enhancement parameters may include (but are not limited to) a repetition parameter, a time resource allocation parameter, a frequency resource allocation parameter, a payload size parameter, and/or other types of parameters. The repetition parameter may indicate a quantity of repetitions for transmitting or receiving a particular type of communication, such as a reference signal, a report, a PDCCH communication, a PDSCH communication, a PUCCH communication, a PUSCH communication, and/or the like. The time resource allocation parameter may indicate one or more time domain resources (e.g., slots, symbols, subframes, and/or the like) for transmitting or receiving a particular type of communication, such as a reference signal, a report, a PDCCH communication, a PDSCH communication, a PUCCH communication, a PUSCH communication, and/or the like.

The frequency resource allocation parameter may indicate one or more frequency domain resources (e.g., resource blocks, resource elements, subcarriers, component carriers, and/or the like) for transmitting or receiving a particular type of communication, such as a reference signal, a report, a PDCCH communication, a PDSCH communication, a PUCCH communication, a PUSCH communication, and/or the like. The payload size parameter may indicate a payload size limit for a particular type of communication, such as a reference signal, a report, a PDCCH communication, a PDSCH communication, a PUCCH communication, a PUSCH communication, and/or the like.

In some aspects, the BS 110 may transmit an indication of the one or more coverage enhancement parameters to the one or more UEs 120. For example, the BS 110 may transmit an indication of the one or more coverage enhancement parameters to the one or more UEs 120 prior to indicating an activation of the one or more coverage enhancement parameters. In some aspects, the BS 110 transmits an indication of the one or more coverage enhancement parameters to a UE 120 in UE-specific signaling, such as UE-specific radio resource control (RRC) signaling, UE-specific DCI signaling, UE-specific MAC-CE signaling, and/or the like. In some aspects, the BS 110 transmits an indication of the one or more coverage enhancement parameters to a plurality of UEs 120 in group-common signaling, such as a group common physical downlink control channel (GC-PDCCH) communication, in a search space configuration for DCI associated with a GC-PDCCH communication, and/or the like. In some aspects, the BS 110 transmits indications of different sets of one or more coverage enhancement parameters in respective configurations for each channel type and/or communication process type.

As further shown in FIG. 3C, and by reference number 308, the BS 110 may transmit an indication to activate the one or more coverage enhancement parameters to the one or more UEs 120. In particular, the BS 110 may transmit an indication to activate the one or more coverage enhancement parameters in a single dynamic signaling communication. For example, if the one or more UEs 120 includes a single UE 120, the BS 110 may unicast the indication to activate the one or more coverage enhancement parameters to the UE 120 in a single UE-specific downlink communication. As another example, if the one or more UEs 120 includes a plurality of UEs 120, the BS 110 may broadcast, multi-cast, or group-cast the indication to activate the one or more coverage enhancement parameters to the plurality of UEs 120 in a single group-common downlink communication.

In some aspects, the single dynamic signaling communication includes a single downlink control information (DCI) communication. In some aspects, the single dynamic signaling communication includes a single medium access control control element (MAC-CE) communication. In some aspects, the single dynamic signaling communication includes a single GC-PDCCH communication.

As further shown in FIG. 3C, and by reference number 310, the one or more UEs 120 may activate the one or more coverage enhancement parameters. In some aspects, the one or more UEs 120 may receive the single dynamic signaling communication and may activate the one or more coverage enhancement parameters based at least in part on the indication, included in the single dynamic signaling communication, to activate the one or more coverage enhancement parameters.

Figure 3D:
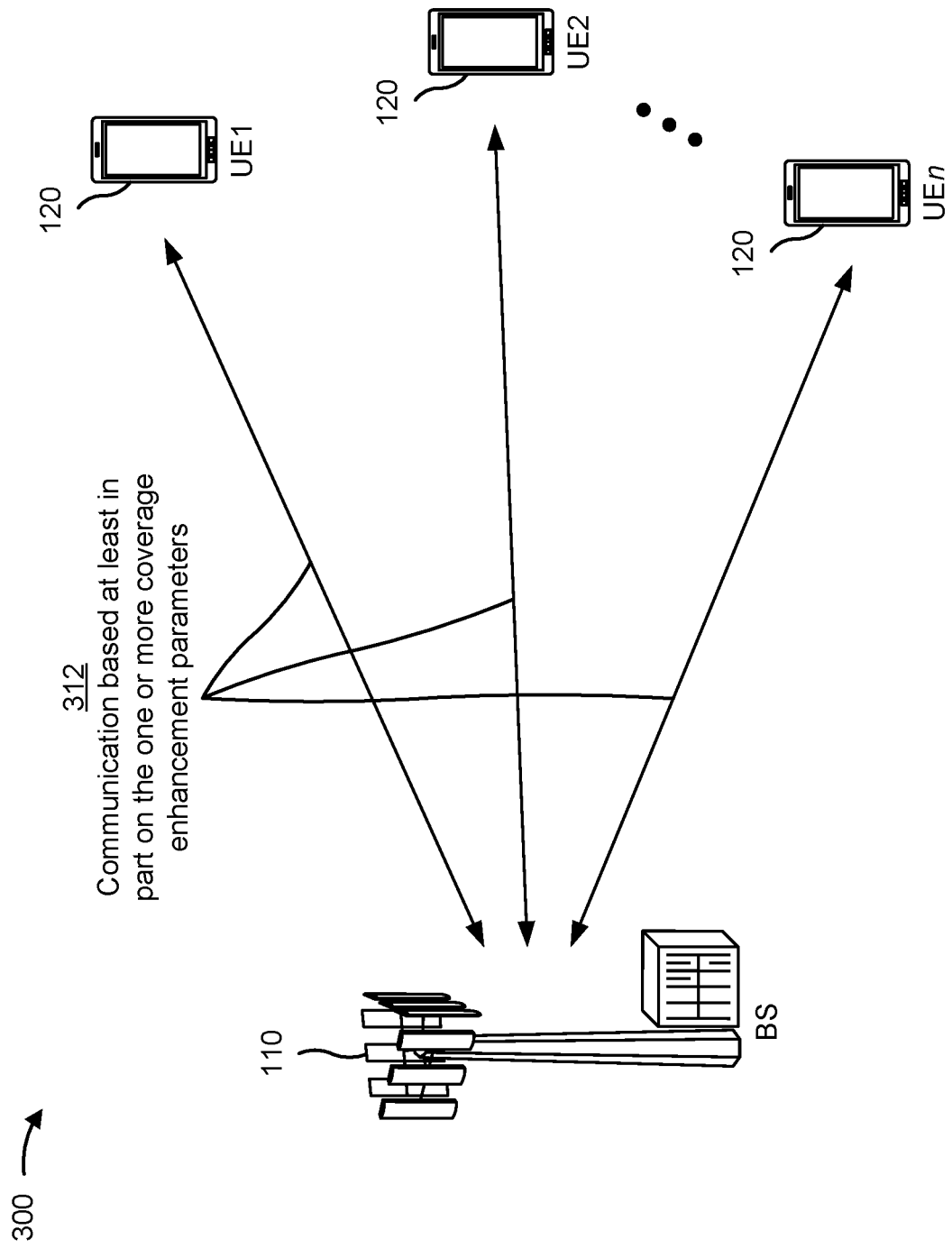

As shown in FIG. 3D, and by reference number 312, the BS 110 and the one or more UEs 120 may communicate based at least in part on the one or more coverage enhancement parameters. In particular, the BS 110 and the one or more UEs 120 may communicate based at least in part on the one or more coverage enhancement parameters after the one or more coverage enhancement parameters have been activated.

For example, a UE 120 may transmit, using a narrow transmit beam associated with the UE 120, a particular quantity of repetitions of a PUCCH communication, a PUSCH communication, a channel state information reference signal (CSI-RS), and/or other types of uplink communications to the BS 110 based at least in part on a repetition parameter included in the one or more coverage enhancement parameters. As another example, a UE 120 may monitor, using a narrow receive beam associated with the UE 120, for a particular quantity of repetitions of a PDCCH communication, a PDSCH communication, a CSI-RS, and/or other types of downlink communications from the BS 110 based at least in part on a repetition parameter included in the one or more coverage enhancement parameters.

As another example, the BS 110 may transmit, using a narrow transmit beam associated with the BS 110, a particular quantity of repetitions of a PDCCH communication, a PDSCH communication, a CSI-RS, and/or other types of downlink communications to one or more UEs 120 based at least in part on a repetition parameter included in the one or more coverage enhancement parameters. As another example, the BS 110 may monitor, using a narrow receive beam associated with the BS 110, for a particular quantity of repetitions of a PUCCH communication, a PUSCH communication, a CSI-RS, and/or other types of uplink communications from one or more UEs 120 based at least in part on a repetition parameter included in the one or more coverage enhancement parameters.

As another example, a UE 120 may transmit, using a narrow transmit beam associated with the UE 120, a PUCCH communication, a PUSCH communication, a CSI-RS, and/or other types of uplink communications to the BS 110 in one or more frequency domain resources indicated by a frequency resource allocation parameter included in the one or more coverage enhancement parameters, in one or more time domain resources indicated by a time resource allocation parameter included in the one or more coverage enhancement parameters, and/or the like. As another example, a UE 120 may monitor, using a narrow receive beam associated with the UE 120, for repetitions of a PDCCH communication, a PDSCH communication, a CSI-RS, and/or other types of downlink communications from the BS 110 in one or more frequency domain resources indicated by a frequency resource allocation parameter included in the one or more coverage enhancement parameters, in one or more time domain resources indicated by a time resource allocation parameter included in the one or more coverage enhancement parameters, and/or the like.

As another example, the BS 110 may transmit, using a narrow transmit beam associated with the BS 110, a PDCCH communication, a PDSCH communication, a CSI-RS, and/or other types of downlink communications to one or more UEs 120 in one or more frequency domain resources indicated by a frequency resource allocation parameter included in the one or more coverage enhancement parameters, in one or more time domain resources indicated by a time resource allocation parameter included in the one or more coverage enhancement parameters, and/or the like. As another example, the BS 110 may monitor, using a narrow receive beam associated with the BS 110, for a PUCCH communication, a PUSCH communication, a CSI-RS, and/or other types of uplink communications from one or more UEs 120 in one or more frequency domain resources indicated by a frequency resource allocation parameter included in the one or more coverage enhancement parameters, in one or more time domain resources indicated by a time resource allocation parameter included in the one or more coverage enhancement parameters, and/or the like.

As another example, the BS 110 may transmit, using a narrow transmit beam associated with the BS 110, a PDCCH communication, a PDSCH communication, an SPS communication, a configured grant communication, or another type of scheduling communication to schedule time domain resources and/or frequency domain resources for the BS 110 and/or the one or more UEs 120 based at least in part on a frequency resource allocation parameter included in the one or more coverage enhancement parameters and/or a time resource allocation parameter included in the one or more coverage enhancement parameters.

As another example, a UE 120 may transmit, using a narrow transmit beam associated with the UE 120, a PUCCH communication, a PUSCH communication, a CSI-RS, and/or other types of uplink communications to the BS 110 having a payload size indicated by a payload size parameter included in the one or more coverage enhancement parameters. As another example, the BS 110 may transmit, using a narrow transmit beam associated with the BS 110, a PDCCH communication, a PDSCH communication, a CSI-RS, and/or other types of downlink communications to one or more UEs 120 having a payload size indicated by a payload size parameter included in the one or more coverage enhancement parameters.

Figure 3E:
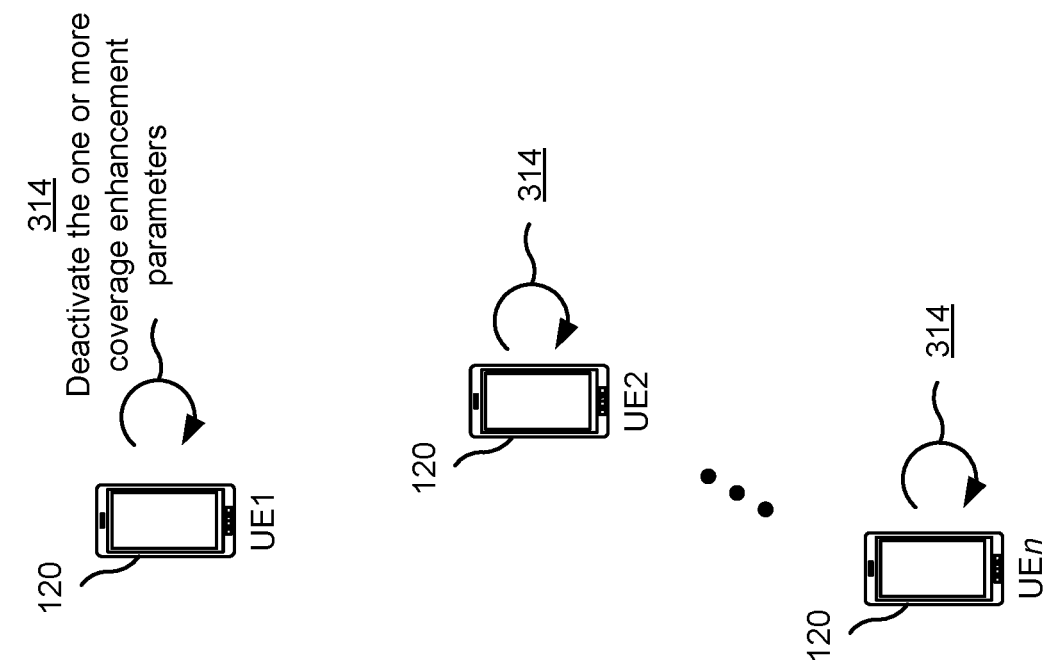
Figure 3E:
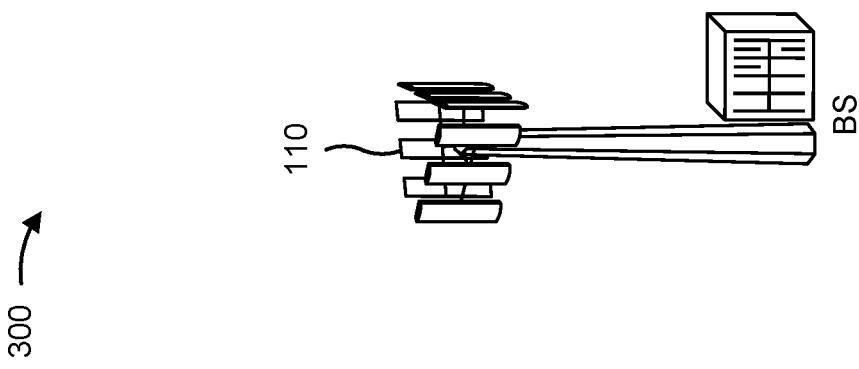

As shown in FIG. 3E, and by reference number 314, the one or more UEs 120 may deactivate the one or more coverage enhancement parameters at a time after the one or more coverage enhancement parameters were activated. The one or more coverage enhancement parameters may be valid and used by the BS 110 and the one or more UEs 120 until deactivation of the one or more coverage enhancement parameters.

In some aspects, the one or more UEs 120 deactivate the one or more coverage enhancement parameters based at least in part on expiration of a timer, associated with the one or more coverage enhancement parameters, relative to a time at which the one or more coverage enhancement parameters were activated. An indication of a duration of the timer may be signaled to the one or more UEs 120 by the BS 110, or may be configured in a data structure of the one or more UEs 120 (e.g., in a memory device, in a storage device, in a table, in an electronic file or file system, in a database, and/or the like) such that the one or more UEs 120 may determine the duration of the timer without additional signaling from the BS 110.

In some aspects, the one or more UEs 120 deactivate the one or more coverage enhancement parameters based at least in part on explicit or implicit signaling received from the BS 110. The signaling may be dynamic signaling included in a DCI communication, a MAC-CE communication, and/or the like. For example, the one or more UEs 120 may deactivate (immediately or after a configured time duration) the one or more coverage enhancement parameters based at least in part on receiving, from the BS 110, a communication that explicitly indicates that the one or more coverage enhancement parameters are to be deactivated. As another example, the one or more UEs 120 may deactivate the one or more coverage enhancement parameters based at least in part on receiving, from the BS 110, a communication that explicitly indicates that the one or more coverage enhancement parameters are to be deactivated after a specified time duration. As another example, the one or more UEs 120 may deactivate the one or more coverage enhancement parameters based at least in part on receiving, from the BS 110, a communication (e.g., a beam switch command or another type of communication) that implicitly indicates that the one or more UEs 120 are to deactivate (immediately or after a configured time duration) the one or more coverage enhancement parameters.

In this way, the BS 110 may signal coverage enhancement parameters to the one or more UEs 120. The BS 110 may signal an activation of the coverage enhancement parameters in a single dynamic signaling communication to the one or more UEs 120, and the one or more UEs 120 may activate the coverage enhancement parameters and may communicate (e.g., on one or more narrow beams) based at least in part on the coverage enhancement parameters. In this way, the single dynamic signaling communication of the coverage enhancement parameters from the BS 110 permits beam performance of the one or more narrow beams to be maintained or increased while indicating the activation to the one or more UEs 120 in a manner that conserves signaling overhead (which reduces radio resource consumption).

As indicated above, FIGS. 3A-3E are provided as one or more examples. Other examples may differ from what is described with respect to FIGS. 3A-3E.

Figure 4:
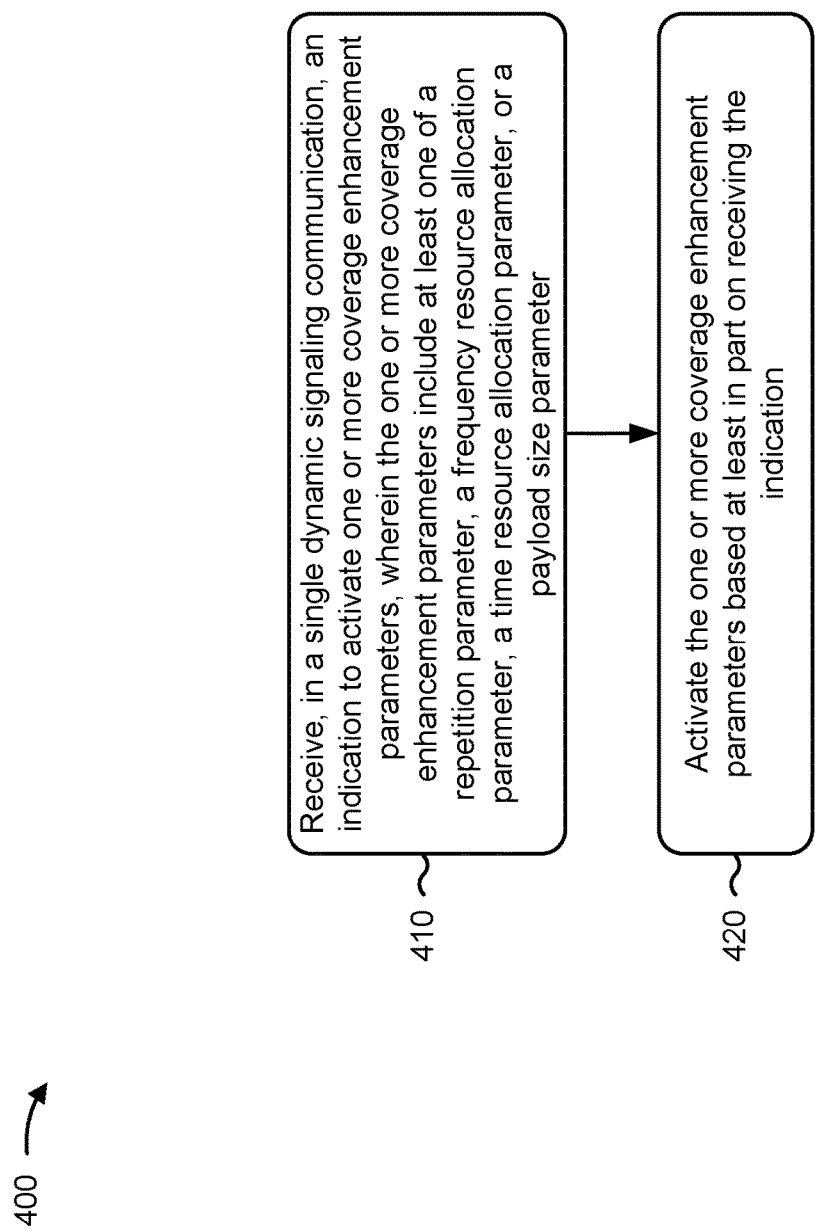
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120 illustrated and described above in connection with one or more of FIGS. 1, 2, and/or 3A-3E) performs operations associated with dynamic signaling for wireless coverage enhancement.

As shown in FIG. 4, in some aspects, process 400 may include receiving, in a single dynamic signaling communication, an indication to activate one or more coverage enhancement parameters, wherein the one or more coverage enhancement parameters include at least one of a repetition parameter, a frequency resource allocation parameter, a time resource allocation parameter, or a payload size parameter (block 410). For example, the UE (e.g., using receive processor 258, transmit processor 264, controller/processor 280, memory 282, and/or the like) may receive, in a single dynamic signaling communication, an indication to activate one or more coverage enhancement parameters, as described above. In some aspects, the one or more coverage enhancement parameters include at least one of a repetition parameter, a frequency resource allocation parameter, a time resource allocation parameter, or a payload size parameter.

As further shown in FIG. 4, in some aspects, process 400 may include activating the one or more coverage enhancement parameters based at least in part on receiving the indication (block 420). For example, the UE (e.g., using receive processor 258, transmit processor 264, controller/processor 280, memory 282, and/or the like) may activate the one or more coverage enhancement parameters based at least in part on receiving the indication, as described above.

Process 400 may include additional aspects, such as any single aspect or any combination of aspects described below and/or in connection with one or more other processes described elsewhere herein.

In a first aspect, receiving the indication to activate the one or more coverage enhancement parameters includes receiving the indication to activate the one or more coverage enhancement parameters in a DCI communication or a MAC-CE communication. In a second aspect, alone or in combination with the first aspect, the one or more coverage enhancement parameters are one or more UE-specific coverage enhancement parameters, and receiving the indication to activate the one or more coverage enhancement parameters includes receiving an indication to activate the one or more UE-specific coverage enhancement parameters.

In a third aspect, alone or in combination with one or more of the first and second aspects, the one or more coverage enhancement parameters are one or more group-common coverage enhancement parameters, and transmitting the indication to activate the one or more coverage enhancement parameters includes receiving an indication to activate the one or more group-common coverage enhancement parameters. In a fourth aspect, alone or in combination with one or more of the first through third aspects, process 400 includes receiving an indication of the one or more group-common coverage enhancement parameters in a UE-specific RRC communication, and receiving the indication to activate the one or more group-common coverage enhancement parameters includes receiving the indication to activate the one or more group-common coverage enhancement parameters in a GC-PDCCH communication.

In a fifth aspect, alone or in combination with one or more of the first through fourth aspects, the indication to activate the one or more group-common coverage enhancement parameters is included in a GC-PDCCH communication, and process 400 includes receiving an indication of the one or more group-common coverage enhancement parameters in a search space configuration for DCI associated with the GC-PDCCH communication. In a sixth aspect, alone or in combination with one or more of the first through fifth aspects, process 400 includes deactivating the one or more coverage enhancement parameters based at least in part on expiration of a timer associated with the one or more coverage enhancement parameters.

In a seventh aspect, alone or in combination with one or more of the first through sixth aspects, process 400 includes receiving an indication to deactivate the one or more coverage enhancement parameters, wherein the communication comprises at least one of a communication that explicitly indicates that the one or more coverage enhancement parameters are to be deactivated, a communication that explicitly indicates that the one or more coverage enhancement parameters are to be deactivated after a time duration, or a beam switch command. In an eighth aspect, alone or in combination with one or more of the first through seventh aspects, the one or more coverage enhancement parameters are configured for at least one of CSI reporting, PDCCH communication, PUCCH communication, SPS, or configured grant scheduling.

In a ninth aspect, alone or in combination with one or more of the first through eighth aspects, receiving the indication to activate the one or more coverage enhancement parameters includes receiving the indication to activate the one or more coverage enhancement parameters based at least in part on beam performance, of one more narrow beams on which the UE communicates with a BS, not satisfying a performance threshold.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
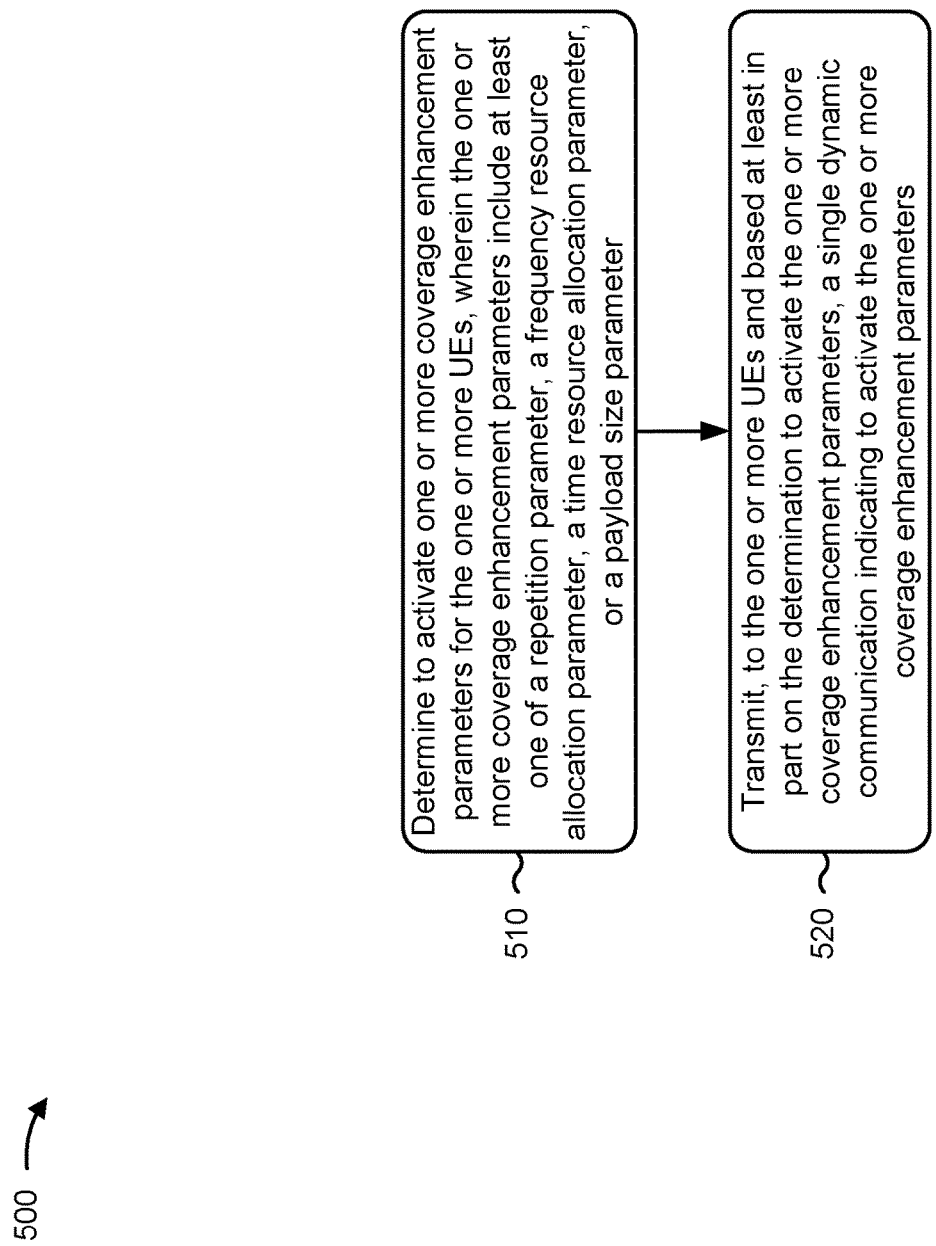
FIG. 5 is a diagram illustrating an example process performed, for example, by a BS, in accordance with the present disclosure.

FIG. 5 is a diagram illustrating an example process 500 performed, for example, by a BS, in accordance with the present disclosure. Example process 500 is an example where the BS (e.g., BS 110 illustrated and described above in connection with one or more of FIGS. 1, 2, and/or 3A-3E) performs operations associated with dynamic signaling for wireless coverage enhancement.

As shown in FIG. 5, in some aspects, process 500 may include determining to activate one or more coverage enhancement parameters for one or more UEs, wherein the one or more coverage enhancement parameters comprise at least one of a repetition parameter, a frequency resource allocation parameter, a time resource allocation parameter, or a payload size parameter (block 510). For example, the BS (e.g., using transmit processor 220, receive processor 238, controller/processor 240, memory 242, and/or the like) may determine to activate one or more coverage enhancement parameters for the one or more UEs, as described above. In some aspects, the one or more coverage enhancement parameters comprise at least one of a repetition parameter, a frequency resource allocation parameter, a time resource allocation parameter, or a payload size parameter.

As further shown in FIG. 5, in some aspects, process 500 may include transmitting, to the one or more UEs and based at least in part on the determination to activate the one or more coverage enhancement parameters, a single dynamic communication indicating to activate the one or more coverage enhancement parameters (block 520). For example, the BS (e.g., using transmit processor 220, receive processor 238, controller/processor 240, memory 242, and/or the like) may transmit, to the one or more UEs and based at least in part on the determination to activate the one or more coverage enhancement parameters, a single dynamic communication indicating to activate the one or more coverage enhancement parameters, as described above.

Process 500 may include additional aspects, such as any single aspect or any combination of aspects described below and/or in connection with one or more other processes described elsewhere herein.

In a first aspect, transmitting the indication to activate the one or more coverage enhancement parameters comprises: transmitting the indication to activate the one or more coverage enhancement parameters in a DCI communication, or a MAC-CE communication. In a second aspect, alone or in combination with the first aspect, the one or more coverage enhancement parameters are one or more UE-specific coverage enhancement parameters, and transmitting the indication to activate the one or more coverage enhancement parameters comprises: transmitting an indication to activate the one or more UE-specific coverage enhancement parameters to a single UE.

In a third aspect, alone or in combination with one or more of the first and second aspects, the one or more coverage enhancement parameters are one or more group-common coverage enhancement parameters, and transmitting the indication to activate the one or more coverage enhancement parameters includes transmitting an indication to activate the one or more group-common coverage enhancement parameters to a plurality of UEs. In a fourth aspect, alone or in combination with one or more of the first through third aspects, process 500 includes transmitting, to each UE of the plurality of UEs, an indication of the one or more group-common coverage enhancement parameters in respective UE-specific RRC communications, wherein the indication to activate the one or more group-common coverage enhancement parameters is included in a GC-PDCCH communication.

In a fifth aspect, alone or in combination with one or more of the first through fourth aspects, the indication to activate the one or more group-common coverage enhancement parameters is included in a GC-PDCCH communication, and process 500 includes transmitting, to the plurality of UEs, an indication of the one or more group-common coverage enhancement parameters in a search space configuration for DCI associated with the GC-PDCCH communication. In a sixth aspect, alone or in combination with one or more of the first through fifth aspects, the one or more coverage enhancement parameters are active until expiration of a timer associated with the one or more coverage enhancement parameters.

In a seventh aspect, alone or in combination with one or more of the first through sixth aspects, process 500 includes transmitting, to the one or more UEs, a communication that deactivates the one or more coverage enhancement parameters, where the communication comprises at least one of: a communication that explicitly indicates that the one or more coverage enhancement parameters are deactivated, a communication that explicitly indicates that the one or more coverage enhancement parameters are to be deactivated after a time duration, or a beam switch command.

In an eighth aspect, alone or in combination with one or more of the first through seventh aspects, determining that the beam performance of the one or more narrow beams does not satisfy the performance threshold includes determining that the beam performance of the one or more narrow beams does not satisfy the performance threshold based at least in part on at least one of one or more CSI reports received from at least a subset of the one or more UEs, one or more HARQ feedback communications received from at least a subset of the one or more UEs, or uplink reception quality associated with at least a subset of the one or more UEs. In a ninth aspect, alone or in combination with one or more of the first through eighth aspects, the one or more coverage enhancement parameters are configured for at least one of CSI reporting, PDCCH communication, PUCCH communication, semi-persistent scheduling, or configured grant scheduling.

In a tenth aspect, alone or in combination with one or more of the first through ninth aspects, process 500 includes identifying the one or more coverage enhancement parameters from a plurality of candidate coverage enhancement parameters configured for one or more physical channel types or one or more communication procedure types. In an eleventh aspect, alone or in combination with one or more of the first through tenth aspects, process 500 includes determining that beam performance of one or more narrow beams, on which the BS communicates with the one or more UEs, does not satisfy a performance threshold; and determining to activate the one or more coverage enhancement parameters for the one or more UEs includes determining to activate the one or more coverage enhancement parameters for the one or more UEs based at least in part on the determination that the beam performance of the one or more narrow beams does not satisfy the performance threshold.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
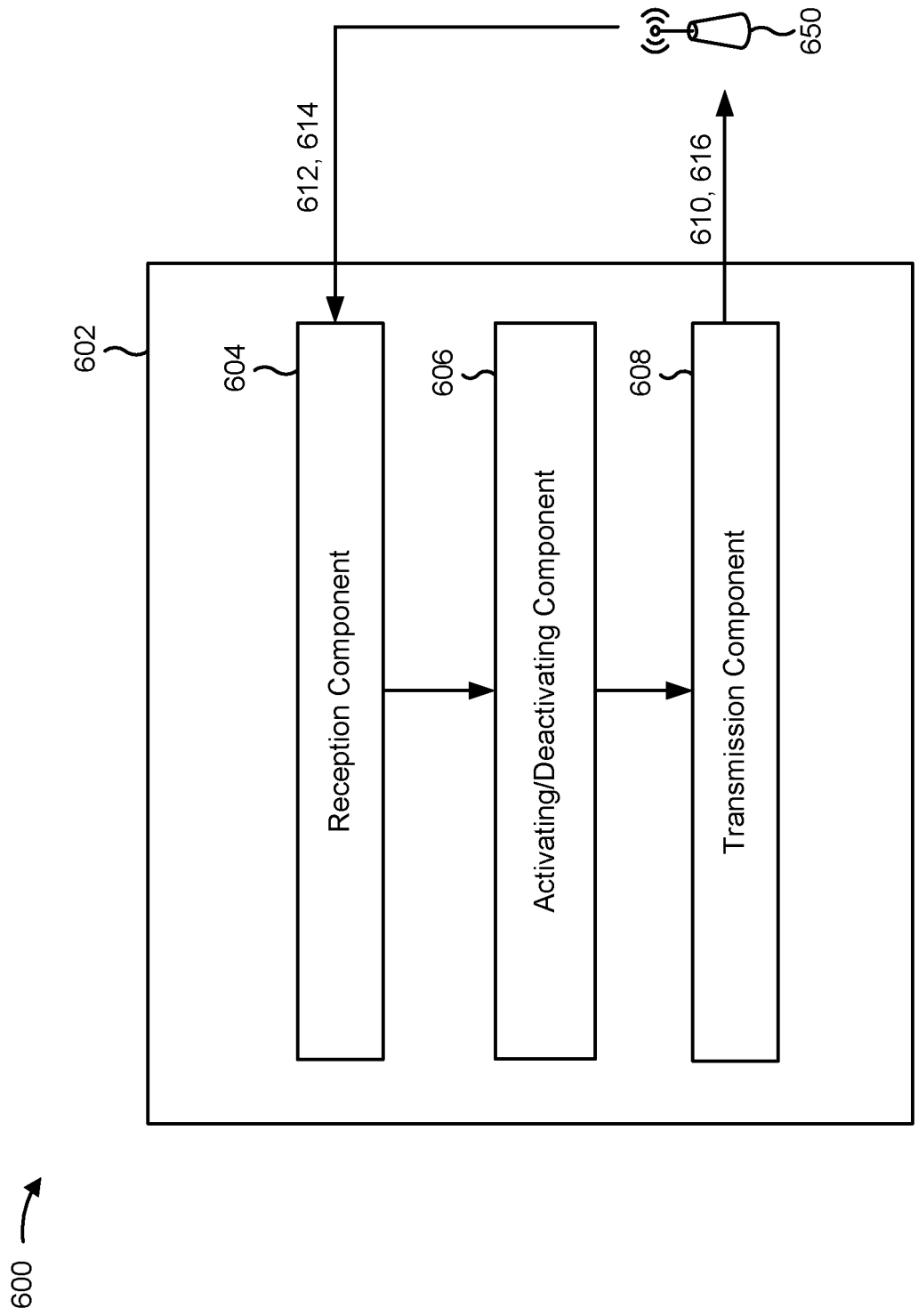
FIGS. 6 and 7 are diagrams illustrating data flows between different components in example apparatuses, in accordance with the present disclosure.

FIG. 6 is a data flow diagram 600 illustrating a data flow between different components in an example apparatus 602. The apparatus 602 may be a UE (e.g., UE 120 illustrated and described above in connection with one or more of FIGS. 1, 2, and/or 3A-3E). In some aspects, the apparatus 602 includes a reception component 604, an activating/deactivating component 606, and/or a transmission component 608.

The transmission component 608 may transmit one or more beam performance indicators 610 to a BS 650 (e.g., BS 110 illustrated and described above in connection with one or more of FIGS. 1, 2, and/or 3A-3E). The beam performance indicators 610 may include CSI reports, HARQ feedback, uplink reception quality, and/or other beam performance indicators. The reception component 604 may receive, from the BS 650 and in a single dynamic signaling communication 612, an indication to activate one or more coverage enhancement parameters. The activating/deactivating component 606 may activate the one or more coverage enhancement parameters based at least in part on reception component 604 receiving the indication of the one or more coverage enhancement parameters in the single dynamic signaling communication 612.

The reception component 604 and/or the transmission component 608 may communicate with the BS 650 based at least in part on the one or more coverage enhancement parameters. For example, the reception component 604 may receive one or more downlink communications 614 from the BS 650 using a narrow reception beam based at least in part on the one or more coverage enhancement parameters. As another example, the transmission component 608 may transmit one or more uplink communications 616 to the BS 650 using a narrow transmission beam based at least in part on the one or more coverage enhancement parameters.

The activating/deactivating component 606 may deactivate the one or more coverage enhancement parameters. For example, the activating/deactivating component 606 may deactivate the one or more coverage enhancement parameters at a time after activating/deactivating component 606 activated the one or more coverage enhancement parameters.

The reception component 604 may include an antenna (e.g., antenna 252), a DEMOD (e.g., DEMOD 254), a MIMO detector (e.g., MIMO detector 256), a receive processor (e.g., receive processor 258), a controller/processor (e.g., controller/processor 280), a memory (e.g., memory 282), and/or the like. The activating/deactivating component 606 may include a receive processor (e.g., receive processor 258), a transmit processor (e.g., transmit processor 264), a controller/processor (e.g., controller/processor 280), a memory (e.g., memory 282), and/or the like. The transmission component 608 may include an antenna (e.g., antenna 252), a MOD (e.g., MOD 254), a TX MIMO processor (e.g., TX MIMO processor 266), a transmit processor (e.g., transmit processor 264), a controller/processor (e.g., controller/processor 280), a memory (e.g., memory 282), and/or the like.

The apparatus may include additional components that perform each of the blocks of the algorithm in the aforementioned process 400 of FIG. 4, process 500 of FIG. 5, and/or the like. Each block in the aforementioned process 400 of FIG. 4, process 500 of FIG. 5, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
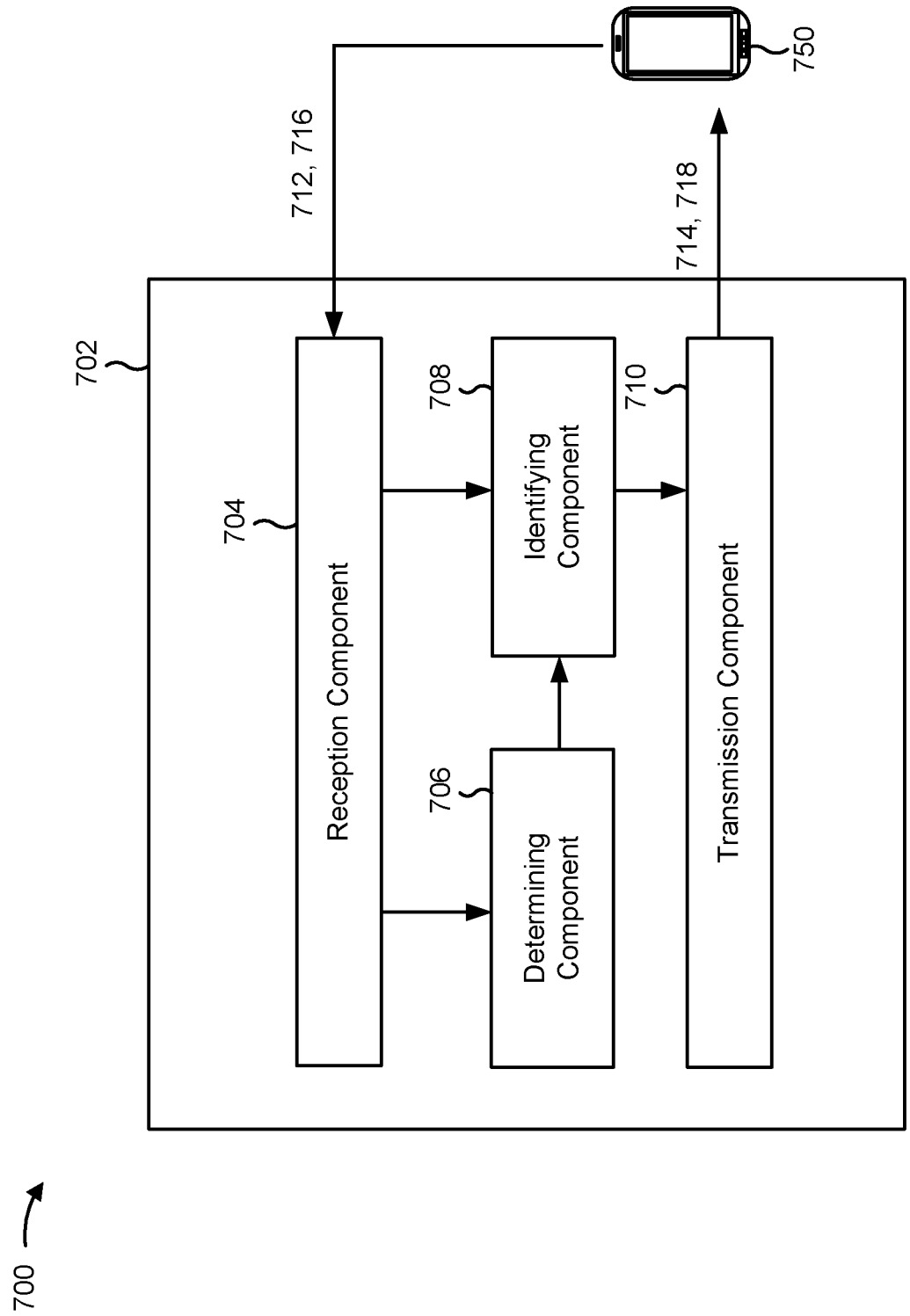

FIG. 7 is a data flow diagram 700 illustrating a data flow between different components in an example apparatus 702. The apparatus 702 may be a BS (e.g., BS 110 illustrated and described above in connection with one or more of FIGS. 1, 2, and/or 3A-3E). In some aspects, the apparatus 702 includes a reception component 704, a determining component 706, an identifying component 708, and/or a transmission component 710.

The reception component 704 may receive an indication 712 of one or more beam performance indicators. In some aspects, the reception component 704 receives the indication 712 of the one or more beam performance indicators from one or more UEs 750 (e.g., UE(s) 120 illustrated and described above in connection with one or more of FIGS. 1, 2, and/or 3A-3E). Reception component 704 may provide the indication 712 of the one or more beam performance indicators to determining component 706.

The determining component 706 may determine that beam performance of one or more narrow beams, on which the apparatus 702 communicates with the one or more UEs 750, does not satisfy a performance threshold. In some aspects, the determining component 706 determines that the beam performance of one or more narrow beams does not satisfy the performance threshold based at least in part on the one or more beam performance indicators and/or other parameters. In these cases, determining component 706 may determine to activate one or more coverage enhancement parameters for the one or more UEs 120.

The identifying component 708 may identify the one or more coverage enhancement parameters for the one or more UEs 120. The transmission component 710 may transmit, to the one or more UEs 120, a single dynamic signaling communication 714 indicating to activate the one or more coverage enhancement parameters.

The reception component 704 and/or the transmission component 710 may communicate with the one or more UEs 120 based at least in part on the one or more coverage enhancement parameters (e.g., after activation of the one or more coverage enhancement parameters). For example, the reception component 704 may receive one or more uplink communications 716 from the one or more UEs 750 based at least in part on the one or more coverage enhancement parameters. As another example, the transmission component 710 may transmit one or more downlink communications 718 to the one or more UEs 750 based at least in part on the one or more coverage enhancement parameters.

The reception component 704 may include an antenna (e.g., antenna 234), a DEMOD (e.g., DEMOD 232), a MIMO detector (e.g., MIMO detector 236), a receive processor (e.g., receive processor 238), a controller/processor (e.g., controller/processor 240), a memory (e.g., memory 242), and/or the like. The determining component 706 may include a transmit processor (e.g., transmit processor 220), a receive processor (e.g., receive processor 238), a controller/processor (e.g., controller/processor 240), a memory (e.g., memory 242), and/or the like. The identifying component 708 may include a transmit processor (e.g., transmit processor 220), a receive processor (e.g., receive processor 238), a controller/processor (e.g., controller/processor 240), a memory (e.g., memory 242), and/or the like. The transmission component 710 may include an antenna (e.g., antenna 234), a MOD (e.g., MOD 232), a TX MIMO processor (e.g., TX MIMO processor 230), a transmit processor (e.g., transmit processor 220), a controller/processor (e.g., controller/processor 240), a memory (e.g., memory 242), and/or the like.

The apparatus may include additional components that perform each of the blocks of the algorithm in the aforementioned process 400 of FIG. 4, process 500 of FIG. 5, and/or the like. Each block in the aforementioned process

400 of FIG. 4, process 500 of FIG. 5, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, in a single dynamic signaling communication, an indication to activate one or more coverage enhancement parameters, wherein the one or more coverage enhancement parameters include at least one of: a repetition parameter, a frequency resource allocation parameter, a time resource allocation parameter, or a payload size parameter; and activating the one or more coverage enhancement parameters based at least in part on receiving the indication.

Aspect 2: The method of Aspect 1, wherein receiving the indication to activate the one or more coverage enhancement parameters comprises: receiving the indication to activate the one or more coverage enhancement parameters in a: a downlink control information (DCI) communication, or a medium access control control element (MAC-CE) communication. Aspect 3: The method of Aspect 1 or 2, wherein the one or more coverage enhancement parameters are one or more UE-specific coverage enhancement parameters; and wherein receiving the indication to activate the one or more coverage enhancement parameters comprises: receiving an indication to activate the one or more UE-specific coverage enhancement parameters.

Aspect 4: The method of Aspect 1 or 2, wherein the one or more coverage enhancement parameters are one or more group-common coverage enhancement parameters; and wherein transmitting the indication to activate the one or more coverage enhancement parameters comprises: receiving an indication to activate the one or more group-common coverage enhancement parameters. Aspect 5: The method of Aspect 4, further comprising: receiving an indication of the one or more group-common coverage enhancement parameters in a UE-specific radio resource control (RRC) communication; and wherein receiving the indication to activate the one or more group-common coverage enhancement parameters comprises: receiving the indication to activate the one or more group-common coverage enhancement parameters is included in a group-common physical downlink control channel (GC-PDCCH) communication. wherein receiving the indication to activate the one or more group-common coverage enhancement parameters comprises: receiving the indication to activate the one or more group-common coverage enhancement parameters is included in a group-common physical downlink control channel (GC-PDCCH) communication.

Aspect 6: The method of Aspect 5, wherein the indication to activate the one or more group-common coverage enhancement parameters is included in a group-common physical downlink control channel (GC-PDCCH) communication; and the method further comprises: receiving an indication of the one or more group-common coverage enhancement parameters in a search space configuration for downlink control information (DCI) associated with the GC-PDCCH communication. Aspect 7: The method of any of Aspects 1-6, further comprising: deactivating the one or more coverage enhancement parameters based at least in part on expiration of a timer associated with the one or more coverage enhancement parameters.

Aspect 8: The method of any of Aspects 1-6, further comprising: receiving an indication to deactivate the one or more coverage enhancement parameters, wherein the communication comprises at least one of: a communication that explicitly indicates that the one or more coverage enhancement parameters are to be deactivated, a communication that explicitly indicates that the one or more coverage enhancement parameters are to be deactivated after a time duration, or a beam switch command.

Aspect 9: The method of any of Aspects 1-8, wherein the one or more coverage enhancement parameters are configured for at least one of: channel state information (CSI) reporting, physical downlink control channel (PDCCH) communication, physical uplink control channel (PUCCH) communication, semi-persistent scheduling, or configured grant scheduling. Aspect 10: The method of any of Aspects 1-9, wherein receiving the indication to activate the one or more coverage enhancement parameters comprises: receiving the indication to activate the one or more coverage enhancement parameters based at least in part on beam performance, of one more narrow beams on which the UE communicates with a base station (BS), not satisfying a performance threshold.

Aspect 11: A method of wireless communication performed by a base station (BS), comprising: determining that beam performance of one or more narrow beams, on which the BS communicates with one or more user equipments (UEs), does not satisfy a performance threshold; determining to activate one or more coverage enhancement parameters for one or more user equipments (UEs), wherein the one or more coverage enhancement parameters comprise at least one of: a repetition parameter, a frequency resource allocation parameter, a time resource allocation parameter, or a payload size parameter; and transmitting, to the one or more UEs and based at least in part on the determination to activate the one or more coverage enhancement parameters, a single dynamic communication indicating to activate the one or more coverage enhancement parameters.

Aspect 12: The method of Aspect 11, wherein transmitting the indication to activate the one or more coverage enhancement parameters comprises: transmitting the indication to activate the one or more coverage enhancement parameters in: a downlink control information (DCI) communication, or a medium access control control element (MAC-CE) communication. Aspect 13: The method of Aspect 11 or 12, wherein the one or more coverage enhancement parameters are one or more UE-specific coverage enhancement parameters; and wherein transmitting the indication to activate the one or more coverage enhancement parameters comprises: transmitting an indication to activate the one or more UE-specific coverage enhancement parameters to a single UE.

Aspect 14: The method of Aspect 11 or 12, wherein the one or more coverage enhancement parameters are one or more group-common coverage enhancement parameters; and wherein transmitting the indication to activate the one or more coverage enhancement parameters comprises: transmitting an indication to activate the one or more group-common coverage enhancement parameters to a plurality of UEs. Aspect 15: The method of Aspect 14, further comprising: transmitting, to each UE of the plurality of UEs, an indication of the one or more group-common coverage enhancement parameters in respective UE-specific radio resource control (RRC) communications, wherein the indication to activate the one or more group-common coverage enhancement parameters is included in a group-common physical downlink control channel (GC-PDCCH) communication.

Aspect 16: The method of Aspect 14, wherein the indication to activate the one or more group-common coverage enhancement parameters is included in a group-common physical downlink control channel (GC-PDCCH) communication; and the method further comprises: transmitting, to the plurality of UEs, an indication of the one or more group-common coverage enhancement parameters in a search space configuration for downlink control information (DCI) associated with the GC-PDCCH communication. Aspect 17: The method of any of Aspects 11-16, wherein the one or more coverage enhancement parameters are active until expiration of a timer associated with the one or more coverage enhancement parameters.

Aspect 18: The method of any of Aspects 11-16, further comprising: transmitting, to the one or more UEs, a communication that deactivates the one or more coverage enhancement parameters, wherein the communication comprises at least one of: a communication that explicitly indicates that the one or more coverage enhancement parameters are deactivated, a communication that explicitly indicates that the one or more coverage enhancement parameters are to be deactivated after a time duration, or a beam switch command. Aspect 19: The method of any of Aspects 11-18, wherein determining that the beam performance of the one or more narrow beams does not satisfy the performance threshold comprises: determining that the beam performance of the one or more narrow beams does not satisfy the performance threshold based at least in part on at least one of: one or more channel state information (CSI) reports received from at least a subset of the one or more UEs, one or more hybrid automatic repeat request (HARD) feedback communications received from at least a subset of the one or more UEs, or uplink reception quality associated with at least a subset of the one or more UEs.

Aspect 20: The method of any of Aspects 11-19, wherein the one or more coverage enhancement parameters are configured for at least one of: channel state information (CSI) reporting, physical downlink control channel (PDCCH) communication, physical uplink control channel (PUCCH) communication, semi-persistent scheduling, or configured grant scheduling. Aspect 21: The method of any of Aspects 11-20, further comprising: identifying the one or more coverage enhancement parameters from a plurality of candidate coverage enhancement parameters configured for one or more physical channel types or one or more communication procedure types.

Aspect 22: The method of any of Aspects 11-22, further comprising: determining that beam performance of one or more narrow beams, on which the BS communicates with the one or more UEs, does not satisfy a performance threshold; and wherein determining to activate the one or more coverage enhancement parameters for the one or more UEs comprises: determining to activate the one or more coverage enhancement parameters for the one or more UEs based at least in part on the determination that the beam performance of the one or more narrow beams does not satisfy the performance threshold. wherein determining to activate the one or more coverage enhancement parameters for the one or more UEs comprises: determining to activate the one or more coverage enhancement parameters for the one or more UEs based at least in part on the determination that the beam performance of the one or more narrow beams does not satisfy the performance threshold.

Aspect 23: An apparatus for wireless communication at a device, comprising a processor; memory coupled with the processor; and instructions stored in the memory and executable by the processor to cause the apparatus to perform the method of one or more Aspects of Aspects 1-10. Aspect 24: A device for wireless communication, comprising a memory and one or more processors coupled to the memory, the memory and the one or more processors configured to perform the method of one or more Aspects of Aspects 1-10.

Aspect 25: An apparatus for wireless communication, comprising at least one means for performing the method of one or more Aspects of Aspects 1-10. Aspect 26: A non-transitory computer-readable medium storing code for wireless communication, the code comprising instructions executable by a processor to perform the method of one or more Aspects of Aspects 1-10. Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 28: An apparatus for wireless communication at a device, comprising a processor; memory coupled with the processor; and instructions stored in the memory and executable by the processor to cause the apparatus to perform the method of one or more Aspects of Aspects 11-22. Aspect 29: A device for wireless communication, comprising a memory and one or more processors coupled to the memory, the memory and the one or more processors configured to perform the method of one or more Aspects of Aspects 11-22.

Aspect 30: An apparatus for wireless communication, comprising at least one means for performing the method of one or more Aspects of Aspects 11-22. Aspect 31: A non-transitory computer-readable medium storing code for wireless communication, the code comprising instructions executable by a processor to perform the method of one or more Aspects of Aspects 11-22. Aspect 32: A non-transitory computer-readable medium storing a set of instructions for wireless communication, the set of instructions comprising one or more instructions that, when executed by one or more processors of a device, cause the device to perform the method of one or more Aspects of Aspects 11-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, in a single dynamic signaling communication, an indication to activate coverage enhancement parameters for communications on one or more narrow beams,
      wherein the communications on the one or more narrow beams are associated with channel state information (CSI) reporting, physical downlink control channel (PDCCH) communications, physical uplink control channel (PUCCH) communications, or configured grant scheduling, and
   wherein the coverage enhancement parameters include:
      a repetition parameter,
      a frequency resource allocation parameter,
      a time resource allocation parameter, and
      a payload size parameter; and
   activating the coverage enhancement parameters based at least in part on receiving the indication.

2. The method of claim 1, wherein receiving the indication to activate the coverage enhancement parameters comprises:
   receiving the indication to activate the coverage enhancement parameters in a:
      a downlink control information (DCI) communication, or
      a medium access control control element (MAC-CE) communication.

3. The method of claim 1, wherein the coverage enhancement parameters are UE-specific coverage enhancement parameters; and
   wherein receiving the indication to activate the coverage enhancement parameters comprises:
      receiving an indication to activate the UE-specific coverage enhancement parameters.

4. The method of claim 1, wherein the coverage enhancement parameters are group-common coverage enhancement parameters; and
   wherein receiving the indication to activate the coverage enhancement parameters comprises:
      receiving an indication to activate the group-common coverage enhancement parameters.

5. The method of claim 4, further comprising:
   receiving an indication of the group-common coverage enhancement parameters in a UE-specific radio resource control (RRC) communication; and
   wherein receiving the indication to activate the group-common coverage enhancement parameters comprises:
      receiving the indication to activate the group-common coverage enhancement parameters is included in a group-common physical downlink control channel (GC-PDCCH) communication.

6. The method of claim 5, wherein the indication to activate the group-common coverage enhancement parameters is included in a physical downlink control channel (GC-PDCCH) communication; and
   the method further comprises:
      receiving an indication of the group-common coverage enhancement parameters in a search space configuration for downlink control information (DCI) associated with the GC-PDCCH communication.

7. The method of claim 1, further comprising:
   deactivating the coverage enhancement parameters based at least in part on expiration of a timer associated with the coverage enhancement parameters.

8. The method of claim 1, further comprising:
   receiving a communication to deactivate the coverage enhancement parameters,
      wherein the communication to deactivate the coverage enhancement parameters comprises at least one of:
         a communication that explicitly indicates that the coverage enhancement parameters are to be deactivated, a communication that explicitly indicates that the coverage enhancement parameters are to be deactivated after a time duration, or a beam switch command.

9. The method of claim 1, wherein receiving the indication to activate the coverage enhancement parameters comprises:

receiving the indication to activate the coverage enhancement parameters based at least in part on beam performance, of one more narrow beams on which the UE communicates with a network entity, not satisfying a performance threshold.

10. A method of wireless communication performed by a network entity, comprising:

determining that beam performance of one or more narrow beams, on which the network entity communicates with one or more user equipments (UEs), does not satisfy a performance threshold;

determining to activate coverage enhancement parameters for one or more UEs for communications on the one or more narrow beams, wherein the communications on the one or more narrow beams are associated with channel state information (CSI) reporting, physical downlink control channel (PDCCH) communications, physical uplink control channel (PUCCH) communications, or configured grant scheduling, and wherein the coverage enhancement parameters comprise:

a repetition parameter, a frequency resource allocation parameter, a time resource allocation parameter, and a payload size parameter; and transmitting, to the one or more UEs and based at least in part on the determination to activate the coverage enhancement parameters, a single dynamic communication indicating to activate the coverage enhancement parameters.

11. The method of claim 10, wherein transmitting the single dynamic communication indicating to activate the coverage enhancement parameters comprises:

transmitting the single dynamic communication indicating to activate the coverage enhancement parameters in:

a downlink control information (DCI) communication, or a medium access control control element (MAC-CE) communication.

12. The method of claim 10, wherein the coverage enhancement parameters are UE-specific coverage enhancement parameters; and wherein transmitting the single dynamic communication indicating to activate the coverage enhancement parameters comprises:

transmitting an indication to activate the UE-specific coverage enhancement parameters to a single UE.

13. The method of claim 10, wherein the coverage enhancement parameters are group-common coverage enhancement parameters; and wherein transmitting the single dynamic communication indicating to activate the coverage enhancement parameters comprises:

transmitting an indication to activate the group-common coverage enhancement parameters to a plurality of UEs.

14. The method of claim 13, further comprising:

transmitting, to each UE of the plurality of UEs, an indication of the group-common coverage enhancement parameters in respective UE-specific radio resource control (RRC) communications, wherein the single dynamic communication indicating to activate the group-common coverage enhancement parameters is included in a group-common physical downlink control channel (GC-PDCCH) communication.

15. The method of claim 13, wherein the single dynamic communication indicating to activate the group-common coverage enhancement parameters is included in a group-common physical downlink control channel (GC-PDCCH) communication; and the method further comprises:

transmitting, to the plurality of UEs, an indication of the group-common coverage enhancement parameters in a search space configuration for downlink control information (DCI) associated with the GC-PDCCH communication.

16. The method of claim 10, wherein the coverage enhancement parameters are active until expiration of a timer associated with the coverage enhancement parameters.

17. The method of claim 10, further comprising:

transmitting, to the one or more UEs, a communication that deactivates the coverage enhancement parameters, wherein the communication that deactivates the coverage enhancement parameters comprises at least one of:

a communication that explicitly indicates that the coverage enhancement parameters are deactivated, a communication that explicitly indicates that the coverage enhancement parameters are to be deactivated after a time duration, or a beam switch command.

18. The method of claim 10, wherein determining that the beam performance of the one or more narrow beams does not satisfy the performance threshold comprises:

determining that the beam performance of the one or more narrow beams does not satisfy the performance threshold based at least in part on at least one of:

one or more channel state information (CSI) reports received from at least a subset of the one or more UEs, one or more hybrid automatic repeat request (HARQ) feedback communications received from at least a subset of the one or more UEs, or uplink reception quality associated with at least a subset of the one or more UEs.

19. The method of claim 10, further comprising:

identifying the coverage enhancement parameters from a plurality of candidate coverage enhancement parameters configured for one or more physical channel types or one or more communication procedure types.

20. The method of claim 10, further comprising:

determining that beam performance of the one or more narrow beams, on which the network entity communicates with the one or more UEs, does not satisfy a performance threshold, wherein determining to activate the coverage enhancement parameters for the one or more UEs comprises:

determining to activate the coverage enhancement parameters for the one or more UEs based at least in part on the determination that the beam performance of the one or more narrow beams does not satisfy the performance threshold.

21. A user equipment (UE) for wireless communication, comprising:
one or more memories; and
one or more processors coupled to the one or more memories, the one or more memories and the one or more processors configured to:
receive, in a single dynamic signaling communication, an indication to activate coverage enhancement parameters for communications on one or more narrow beams,
wherein the communications on the one or more narrow beams are associated with channel state information (CSI) reporting, physical downlink control channel (PDCCH) communications, physical uplink control channel (PUCCH) communications, or configured grant scheduling, and
wherein the coverage enhancement parameters include:
a repetition parameter,
a frequency resource allocation parameter,
a time resource allocation parameter, and
a payload size parameter; and
activate the coverage enhancement parameters based at least in part on receiving the indication.

22. The UE of claim 21, wherein the coverage enhancement parameters are UE-specific coverage enhancement parameters; and
wherein the one or more processors, when receiving the indication to activate the coverage enhancement parameters, are configured to:
receive an indication to activate the UE-specific coverage enhancement parameters.

23. The UE of claim 21, wherein the coverage enhancement parameters are group-common coverage enhancement parameters; and
wherein the one or more processors, when transmitting the indication to activate the coverage enhancement parameters, are configured to:
receive an indication to activate the group-common coverage enhancement parameters.

24. The UE of claim 23, wherein the UE wherein the one or more processors are further configured to:
receive an indication of the group-common coverage enhancement parameters in a UE-specific radio resource control (RRC) communication; and
wherein the one or more processors, when receiving the indication to activate the group-common coverage enhancement parameters, are configured to:
receive the indication to activate the group-common coverage enhancement parameters is included in a group-common physical downlink control channel (GC-PDCCH) communication.

25. The UE of claim 21, wherein the one or more processors, when receiving the indication to activate the coverage enhancement parameters, are configured to:
receive the indication to activate the coverage enhancement parameters based at least in part on beam performance, of the one or more narrow beams on which the UE communicates with a network entity, not satisfying a performance threshold.

26. The UE of claim 21, wherein the one or more processors, when receiving the indication to activate the coverage enhancement parameters, are configured to:
receive the indication to activate the coverage enhancement parameters in a:
a downlink control information (DCI) communication, or
a medium access control control element (MAC-CE) communication.

27. The UE of claim 21, wherein the UE wherein the one or more processors are further configured to:
deactivate the coverage enhancement parameters based at least in part on expiration of a timer associated with the coverage enhancement parameters.

28. A network entity for wireless communication, comprising:
one or more memories; and
one or more processors coupled to the one or more memories, the one or more memories and the one or more processors configured to:
determine to activate coverage enhancement parameters for one or more user equipments (UEs) for communications on one or more narrow beams,
wherein the communications on the one or more narrow beams are associated with channel state information (CSI) reporting, physical downlink control channel (PDCCH) communications, physical uplink control channel (PUCCH) communications, or configured grant scheduling, and
wherein the coverage enhancement parameters include:
a repetition parameter,
a frequency resource allocation parameter,
a time resource allocation parameter, and
a payload size parameter; and
transmit, to the one or more UEs and based at least in part on the determination to activate the coverage enhancement parameters, a single dynamic communication indicating to activate the coverage enhancement parameters.

29. The network entity of claim 28, wherein the coverage enhancement parameters are group-common coverage enhancement parameters; and
wherein the one or more processors, when transmitting the single dynamic communication indicating to activate the coverage enhancement parameters, are configured to:
transmit an indication to activate the group-common coverage enhancement parameters to a plurality of UEs.

30. The network entity of claim 28, wherein the one or more processors are further configured to:
determine that beam performance of one or more narrow beams, on which the network entity communicates with the one or more UEs, does not satisfy a performance threshold; and
wherein the one or more processors, when determining to activate the coverage enhancement parameters for the one or more UEs, are configured to:
determine to activate the coverage enhancement parameters for the one or more UEs based at least in part on the determination that the beam performance of the one or more narrow beams does not satisfy the performance threshold.

* * * * *